(12) United States Patent
Suzuki et al.

(10) Patent No.: US 8,159,947 B2
(45) Date of Patent: Apr. 17, 2012

(54) TRAFFIC ENGINEERING APPARATUS, NETWORK SYSTEM, AND TRAFFIC CONTROL METHOD AND PROGRAM

(75) Inventors: Kazuya Suzuki, Tokyo (JP); Masahiro Jibiki, Tokyo (JP); Tomohiko Yagyu, Tokyo (JP); Takaaki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 176 days.

(21) Appl. No.: 12/496,106

(22) Filed: Jul. 1, 2009

(65) Prior Publication Data

US 2010/0172240 A1 Jul. 8, 2010

(30) Foreign Application Priority Data

Jul. 3, 2008 (JP) .................................. 2008-174782

(51) Int. Cl.
*H04L 12/26* (2006.01)
*G06F 15/173* (2006.01)

(52) U.S. Cl. ......... 370/232; 370/238; 370/401; 709/241

(58) Field of Classification Search .......... 370/352–356, 370/230.1, 229, 230, 252, 238, 401, 395.31, 370/232, 412–413; 709/241–242, 239, 243
See application file for complete search history.

(56) References Cited

U.S. PATENT DOCUMENTS

| | | | |
|---|---|---|---|
| 6,400,681 B1* | 6/2002 | Bertin et al. | 370/218 |
| 6,778,496 B1* | 8/2004 | Meempat et al. | 370/230 |
| 7,302,494 B2* | 11/2007 | Hayashi et al. | 709/239 |
| 7,801,048 B1* | 9/2010 | Sivabalan et al. | 370/238 |
| 7,814,227 B2* | 10/2010 | Vasseur et al. | 709/241 |
| 7,890,656 B2* | 2/2011 | Nakamichi et al. | 709/241 |
| 2002/0141345 A1* | 10/2002 | Szviatovszki et al. | 370/238 |
| 2002/0147842 A1* | 10/2002 | Breitbart et al. | 709/241 |
| 2007/0230346 A1* | 10/2007 | Yamada et al. | 370/235 |
| 2007/0268821 A1* | 11/2007 | Levit et al. | 370/223 |

FOREIGN PATENT DOCUMENTS

| | | | |
|---|---|---|---|
| JP | 2005318409 A | | 11/2005 |
| JP | 2006033235 A | | 2/2006 |
| JP | 2006229651 A | | 8/2006 |

OTHER PUBLICATIONS

Y. Rekhter, et al., "A Border Gateway Protocol 4 (BGP-4)", Network Working Group, RFC4271, Jan. 2006, p. 1-104.

* cited by examiner

*Primary Examiner* — Kwang B Yao
*Assistant Examiner* — Candal Elpenord

(57) ABSTRACT

The present invention provides a traffic engineering apparatus which performs traffic engineering, including: an optimal branch point determination unit which determines an optimal branch point in a network to realize a predetermined policy; and a traffic flow regulation unit which regulates a traffic flow rate into the local node during reception of traffic based on the optimal branch point determined by the optimal branch point determination unit.

15 Claims, 20 Drawing Sheets

FIG. 2

TRAFFIC VOLUME TABLE FOR LINK Y

| SOURCE AS \ DESTINATION ADDRESS BLOCK | 200.X.0.0/24 | 200.X.1.0/24 | 200.X.2.0/24 | ... | TOTAL |
|---|---|---|---|---|---|
| AS 1 | 289 | 281 | 549 | | 18927 |
| AS 2 | 1789 | 4910 | 18506 | | 82918 |
| AS 3 | 0 | 0 | 0 | | |
| ... | | | | | |
| TOTAL | 21897 | 19789 | 127058 | | 1108288 |

FIG. 3

| PREFIX | AS |
|---|---|
| 1.0.0.0/8 | 65451 |
| 2.0.0.0/8 | 65458 |
| ... | ... |

FIG. 4

421 — INTEGRATED TRAFFIC VOLUME TABLE FOR LINK Y

| 401 | DESTINATION ADDRESS BLOCK | | | | |
|---|---|---|---|---|---|
| | | 200.X.0.0/24 | 200.X.1.0/24 | 200.X.2.0/24 | ... |
| SOURCE AS | AS 1 | 12290110 | 26076094 | 2890070524 | |
| | AS 2 | 3739682 | 46102852 | 382503623 | |
| | AS 3 | 0 | 0 | 0 | |
| | ... | | | | |

422

FIG. 10
1. TYPICAL BGP UPDATE MESSAGE
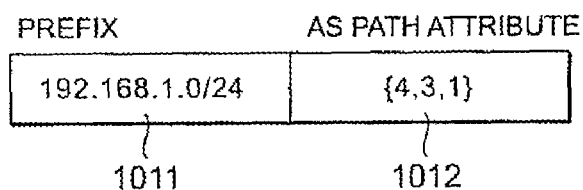
2. BGP UPDATE MESSAGE ACCORDING TO PRESENT INVENTION
   (EXPLICIT AS UPDATE MESSAGE)
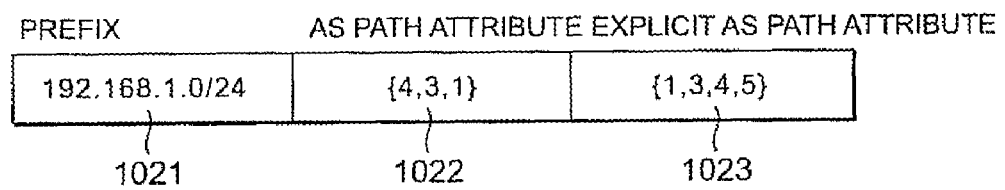

US 8,159,947 B2

TRAFFIC ENGINEERING APPARATUS, NETWORK SYSTEM, AND TRAFFIC CONTROL METHOD AND PROGRAM

This application is based upon and claims priority from Japanese Patent Application No. 2008-174872 filed Jul. 3, 2008, which is incorporated herein in its entirety by reference.

BACKGROUND OF THE INVENTION

1. Field of the Invention

The present invention relates to a traffic engineering apparatus which performs traffic engineering, a network system equipped with the traffic engineering apparatus, a traffic control method and traffic control program which control traffic flow rates.

2. Description of the Related Art

With the spread of the Internet, the number of domains connected to the Internet is growing steadily. The internet is a collection of networks known as domains. The domain is a network managed by a single management body with consistent policy. Communications are established among domains by exchanging their route information using an interdomain routing protocol.

Currently, BGP4 is used as an interdomain routing protocol on the Internet (see Y. Rekhter, T. Li, and S. Hares, "A Border Gateway Protocol 4 (BGP-4)," RFC 4271, Internet Engineering Task Force, 2006). In BGP4 terminology, a domain is referred to as an AS (Autonomous System).

When communicating using BGP4, an AS informs an adjacent AS of an address prefix in the local AS. Then, the informed AS (specifically, a BGP router) informs next adjacent AS of the address prefix by attaching its own AS number. In this way, when an address prefix is announced from an AS, the address prefix propagates from AS to AS with an AS number being attached by each AS which passes the address prefix.

FIG. 19 is an explanatory diagram showing how an address prefix propagates using BGP. AS 1 attaches its own AS number "1" to an address prefix "192.168.1.0/24" in the local AS. Then, AS 1 transmits a BGP UPDATE message to adjacent ASes, namely, AS 2 and AS 3 with its own AS number attached. Upon receiving the BGP UPDATE message, AS 2 and AS 3 transmit BGP UPDATE messages to their adjacent ASes with their respective AS numbers attached. Similarly, upon receiving the BGP UPDATE message, each AS transfers a packet whose address matches the address prefix to the AS from which the BGP UPDATE message has been received.

In the example shown in FIG. 19, AS 5 receives BGP UPDATE messages whose address prefix is "192.168.1.0/24" from adjacent AS 2 and AS 4. AS 5 compares an AS PATH attribute attached to the address prefix in the BGP UPDATE messages received respectively from AS 2 and AS 4. Then, AS 5 adapts the BGP UPDATE message which has the shorter AS PATH length. In the example shown in FIG. 19, a BGP UPDATE message 1913 has an AS PATH length of 2 while a BGP UPDATE message 1915 has an AS PATH length of 3. Consequently, AS 5 adapts the BGP UPDATE message 1913 and transfers the packet.

A routing protocol by which an address prefix is propagated with the AS numbers of ASes on the route being recorded as described above is known as a path vector routing protocol.

Next, traffic engineering using BGP will be described with reference to FIG. 20. AS 1 divides the address prefix "192.168.1.0/24" in the local AS into two address blocks "192.168.1.0/25" and "192.168.1.128/25". Then, AS 1 transmits the respective address blocks to different ASes using BGP UPDATE messages. Consequently, packets addressed, for example, to "192.168.1.1" out of addresses in the AS 1 arrive at AS 1 only via a link connected to AS 2. On the other hand, packets addressed, for example, to "192.168.1.129" arrive at AS 1 via a link connected to AS 3.

However, an apparatus which performs traffic engineering (hereinafter also referred to as TE) using BGP cannot control a propagation range of BGP UPDATE messages. This extends the propagation range of BGP UPDATE messages. Consequently, when ASes perform TE one after another, the number of BGP UPDATE messages increases, resulting in an increased processing load of the BGP UPDATE messages.

In the implementation example of TE shown in FIG. 20, AS 1 divides the address prefix in the local AS into two address blocks and informs other ASes of the two address blocks using different BGP UPDATE messages. However, it can be seen that the number of messages has been increased in the example of FIG. 20 compared to the example of FIG. 19 in which TE is not performed.

SUMMARY OF THE INVENTION

The present invention has been made to solve the above problem. An object of the present invention is to provide a traffic engineering apparatus, network system, traffic control method, and traffic control program which can prevent increases in the number of messages and thereby prevent increases in message processing load when performing traffic engineering.

The present invention provides a traffic engineering apparatus which performs traffic engineering, comprising: an optimal branch point determination unit which determines an optimal branch point in a network to realize a predetermined policy; and a traffic flow regulation unit which regulates a traffic flow rate into the local node during reception of traffic based on the optimal branch point determined by the optimal branch point determination unit.

The present invention provides a network system including a traffic engineering apparatus which performs traffic engineering, wherein: the traffic engineering apparatus comprises an optimal branch point determination unit which determines an optimal branch point in a network to realize a predetermined policy; and a traffic flow regulation unit which regulates a traffic flow rate into the local node during reception of traffic based on the optimal branch point determined by the optimal branch point determination unit.

The present invention provides a network control method, which is a traffic control method which performs traffic flow control, comprising: an optimal branch point determination step of determining an optimal branch point in a network to realize a predetermined policy; and a traffic flow regulation step of regulating a traffic flow rate into the local node during reception of traffic based on the optimal branch point determined by the optimal branch point determination step.

The present invention provides a network control program, which is a traffic control program for traffic flow control, wherein the traffic control program makes a computer perform: an optimal branch point determination process for determining an optimal branch point in a network to realize a predetermined policy; and a traffic flow regulation process for regulating a traffic flow rate into the local node during reception of traffic based on the optimal branch point determined by the optimal branch point determination process.

The present invention can prevent the number of messages from increasing and thereby prevent message processing load from increasing when performing traffic engineering.

BRIEF DESCRIPTION OF THE DRAWINGS

FIG. 2 is an explanatory diagram showing an example of a traffic volume table for a link Y;

FIG. 3 is an explanatory diagram showing an example of a prefix correspondence table;

FIG. 4 is an explanatory diagram showing an example of an integrated traffic volume table;

FIG. 6 is a flowchart showing an example of a process of determining a TE target AS;

FIG. 10 is an explanatory diagram showing an example of an Explicit AS PATH attribute;

DETAILED DESCRIPTION OF THE PREFERRED EMBODIMENTS

First Embodiment

A first embodiment of the present invention will be described below with reference to the drawings. The present embodiment relates to a traffic engineering apparatus which performs traffic engineering (TE) in interdomain routing.

First, the traffic engineering apparatus according to the present invention will be outlined. To limit the range of influence, the traffic engineering apparatus according to the present invention transmits a special BGP UPDATE message so that only a small number of ASes will act as TE branch points. To realize a TE policy set up in advance by an administrator, the traffic engineering apparatus autonomously determines appropriate destination ASes of BGP UPDATE based on traffic conditions and topology information. This enables implementing a traffic engineering apparatus, network system, network control method, and network control program which can achieve traffic engineering with a limited range.

Figure 1:
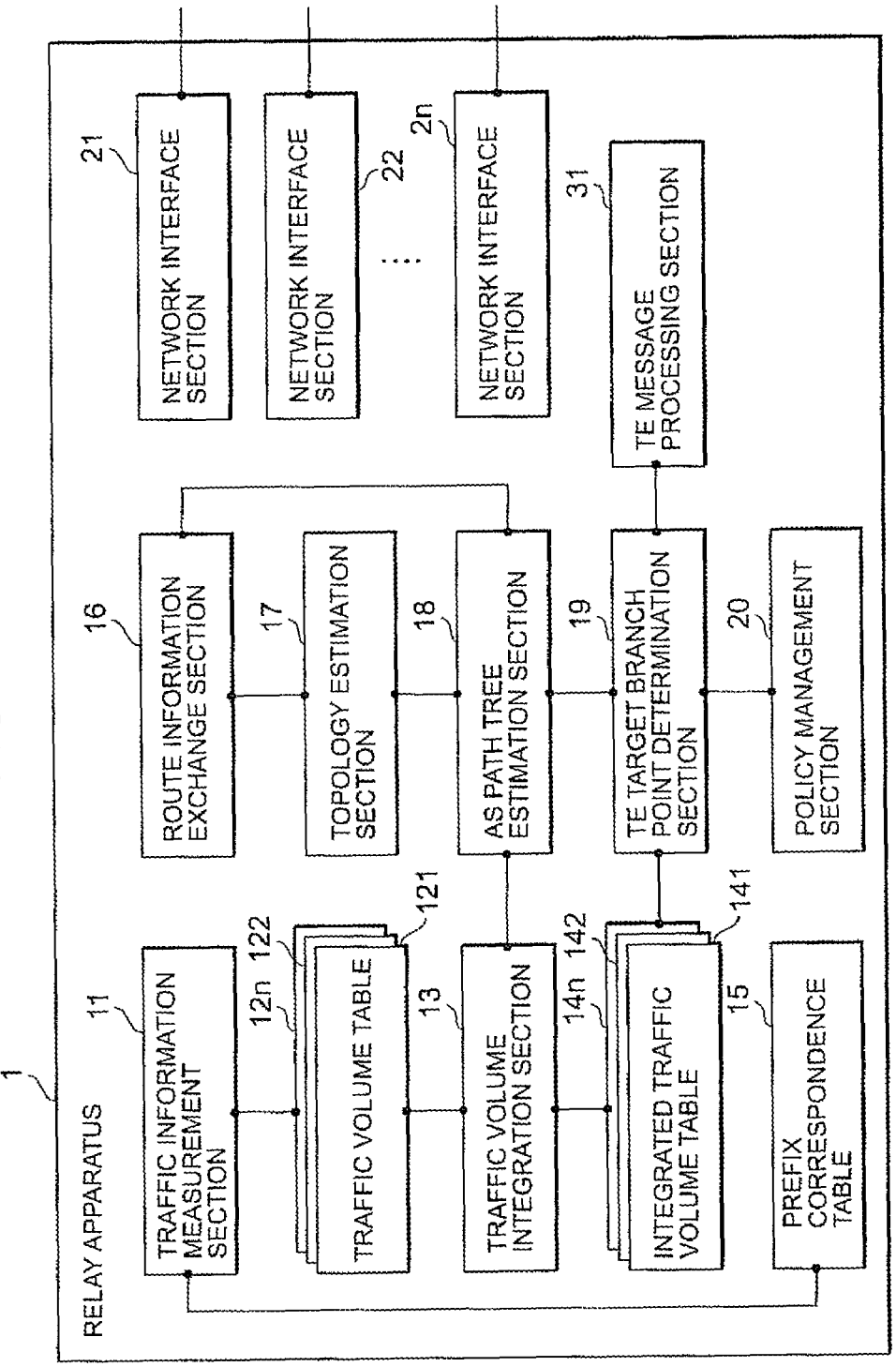
FIG. 1 is a block diagram showing an exemplary configuration of a relay apparatus according to the present invention.

FIG. 1 is a block diagram showing an exemplary configuration of a relay apparatus according to the present invention. As shown in FIG. 1, the relay apparatus 1 includes a traffic information measurement section 11, traffic volume tables 121 to 12n, a traffic volume integration section 13, integrated traffic volume tables 141 to 14n, a prefix correspondence table 15, a route information exchange section 16, a topology estimation section 17, an AS path tree estimation section 18, a TE target branch point determination section 19, a policy management section 20, network interface sections 21 to 2n, and a TE message processing section 31.

According to the present embodiment, the traffic engineering apparatus is implemented by the relay apparatus 1. Specifically, the relay apparatus 1 is implemented by a network apparatus such as a BGP router. Alternatively, the relay apparatus 1 may be implemented, for example, by an information processor such as a personal computer which has a router function and operates according to a program.

The traffic information measurement section 11 has a function to measure traffic information such as a destination address, source address, packet size thereof, and or a traffic volume on a packet using traffic which flows into the relay apparatus 1 or relay apparatus 1 receives via the network interface sections 21 to 2n Also, the traffic information measurement section 11 has a function to store the measured traffic information and traffic volumes in the traffic volume tables 121 to 12n.

Specifically, the traffic volume tables 121 to 12n are stored in a memory or other storage device (not shown) of the relay apparatus 1. The traffic volume tables 121 to 12n store the traffic information and traffic volumes which the traffic information measurement section 11 measures. The traffic information and traffic volumes are classified according to source ASes and destination address blocks. As shown in FIG. 1, in the present embodiment, the relay apparatus 1 has plural traffic volume tables 121 to 12n. In this case, each of the traffic volume tables 121 to 12n corresponds to each network interface section via which the local AS is connected with each adjacent AS.

Figure 7:
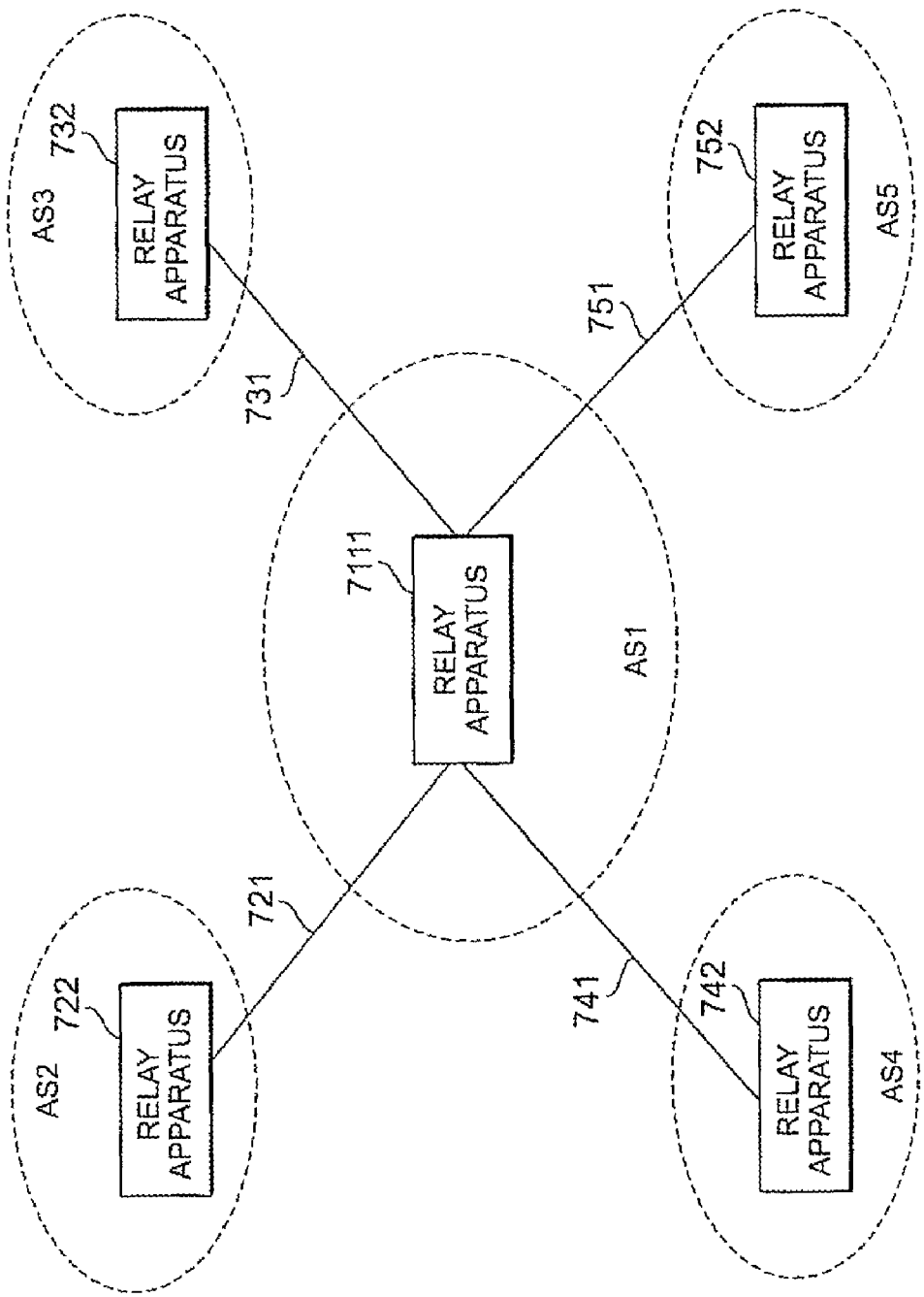
FIG. 7 is a block diagram showing an exemplary configuration of a network system in which relay apparatuses are included.

For example, it is assumed that the relay apparatus 1 based on traffic engineering is applied to a network system shown in FIG. 7. As shown in FIG. 7, AS 1 has four links (721, 731, 741, and 751 in FIG. 7) to connect to adjacent ASes. Also, AS 1 (specifically, a relay apparatus 7111) has four network interface sections to connect to the links 721, 731, 741, and 751.

Besides, in the exemplary configuration in FIG. 7, the relay apparatus 7111 also has four traffic volume tables, which are used to record traffic volumes flowing in through the links 721, 731, 741, and 751, respectively.

FIG. 2 is an explanatory diagram showing an example of a traffic volume table for a link Y. In the example of FIG. 2, rows 222 in the traffic volume table 201 represent source ASes of respective packets. The traffic information measurement section 11 refers to the source address of each packet. Next, the traffic information measurement section 11 finds which AS the source address belongs to, based on the prefix correspondence table in FIG. 3 described later. Consequently, the traffic information measurement section 11 can learn or establish the source AS of the packet and measure its traffic volume.

Then, the traffic information measurement section 11 stores the established source AS in the traffic volume table.

In FIG. 2, columns 221 represent address blocks obtained by dividing the prefix in the local AS. Assuming that, for example, the local AS has a prefix "200.X.0.0/16", FIG. 2 shows an example in which the prefix "200.X.0.0/16" has been divided into 256 address blocks: "200.X.0.0/24", "200.X.1.0/24", and so on.

Incidentally, although in the example of FIG. 2, the prefix is divided into 256 address blocks, the prefix in the local AS may be used as a single address block without division in the traffic volume table. In that case, the traffic volume table will have only one column 221.

The packet addressed to the local AS is the packet whose address contains the prefix in the local AS. The traffic information measurement section 11 can identify the address block by referring to an address field of the received packet addressed to the local AS. In the traffic volume table shown in FIG. 2, the traffic information measurement section 11 adds a packet size value of the received packet to the address block field that matches the source AS and destination address in the received packet and stores the result. Also, in the traffic volume table of FIG. 2, the traffic information measurement section 11 records column totals 223 and row totals 224. Furthermore, in the traffic volume table of FIG. 2, the traffic information measurement section 11 records a traffic volume 225 of the entire traffic flowing into the link Y.

The traffic volume integration section 13 has a function to integrate the traffic volumes stored in the traffic volume tables 121 to 12n based on an AS path tree estimated by the AS path tree estimation section 18. Also, the traffic volume integration section 13 has a function to store the integrated values of the traffic volumes in the integrated traffic volume tables 141 to 14n.

Specifically, the integrated traffic volume tables 141 to 14n are stored in a memory or other storage device of the relay apparatus 1. The integrated traffic volume tables 141 to 14n store the integrated traffic volumes calculated by the traffic volume integration section 13. According to the present embodiment, the relay apparatus 1 has plural integrated traffic volume tables 141 to 14n.

FIG. 4 is an explanatory diagram showing an example of the integrated traffic volume table. In the integrated traffic volume table of FIG. 4, rows 422 and columns 421 correspond respectively to rows 222 and columns 221 in the traffic volume table of FIG. 2.

Figure 3:
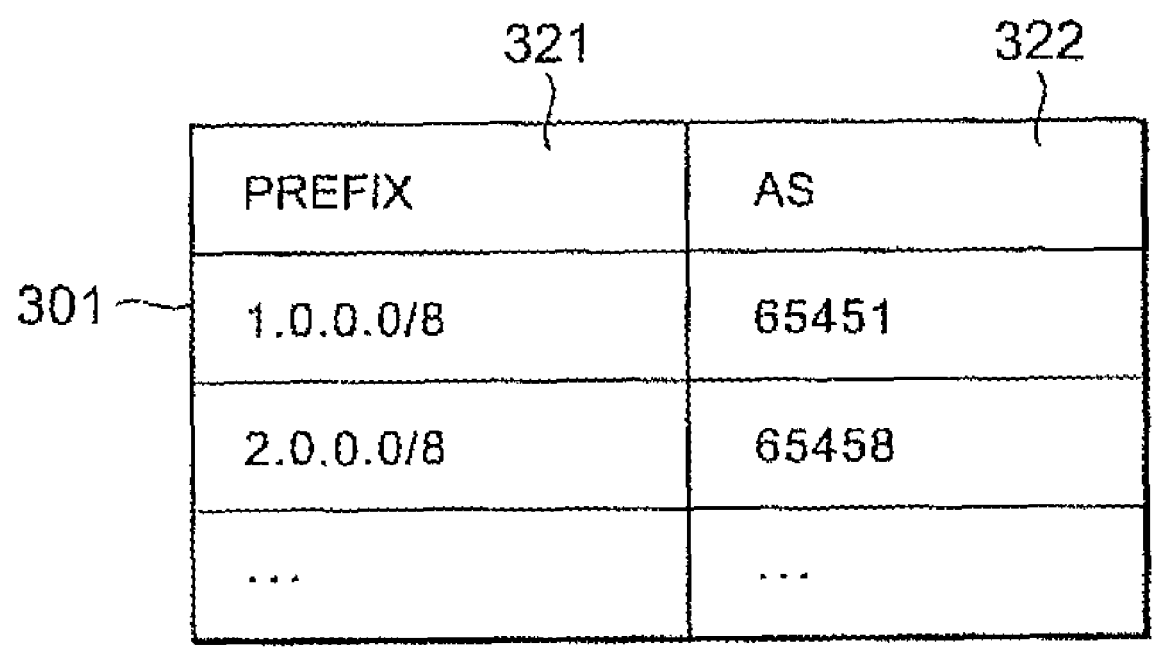

Specifically, the prefix correspondence table 15 is stored in a memory or other storage device of the relay apparatus 1. The prefix correspondence table 15 holds the correspondence between prefixes related to ASes and AS numbers. FIG. 3 is an explanatory diagram showing an example of the prefix correspondence table. As shown in FIG. 3, the prefix correspondence table stores the correspondence between prefixes 321 and AS numbers 322.

The route information exchange section 16 has a function to exchange route information with adjacent ASes using BGP. Also, the route information exchange section 16 has a function to extract information about AS paths from the route information acquired or received from the adjacent ASes through the exchange. Furthermore, the route information exchange section 16 has a function to output the extracted AS path information to the topology estimation section 17.

Figure 8:
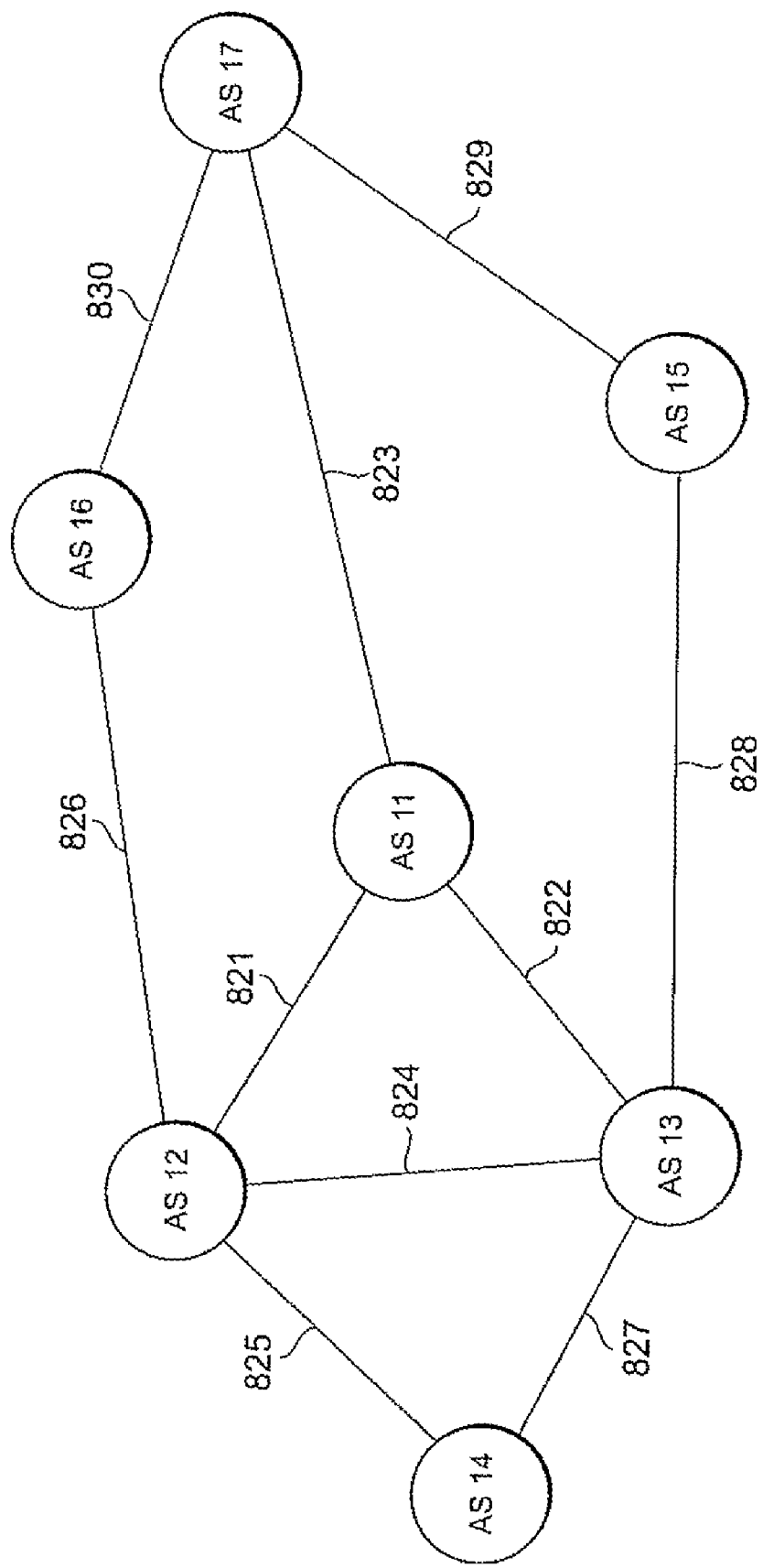
FIG. 8 is an explanatory diagram showing an example of a topology map created by a topology estimation section.

The topology estimation section 17 has a function to create a topology map which represents connections among ASes. The topology estimation section 17 creates the topology map based on the AS path information acquired (extracted) by the route information exchange section 16. FIG. 8 is an explanatory diagram showing an example of the topology map created by the topology estimation section 17. In the example shown in FIG. 8, AS 11 to AS 17 represent the ASes contained in the topology map. Also, in FIG. 8, lines 821 to 830 represent links which connect the ASes.

The AS path tree estimation section 18 has a function to create an AS path tree. The AS path tree shows AS paths through which the traffic originated from ASes has reached the local AS. The AS path tree estimation section 18 creates the AS path tree based on the topology map estimated (created) by the topology estimation section 17 and AS path information acquired (extracted) by the route information exchange section 16.

Furthermore, the AS path tree estimation section 18 has a grouping function. The AS path tree estimation section 18 does grouping based on information obtained from the created AS path tree, i.e., information about the links through which the traffic from ASes has been received.

Figure 9:
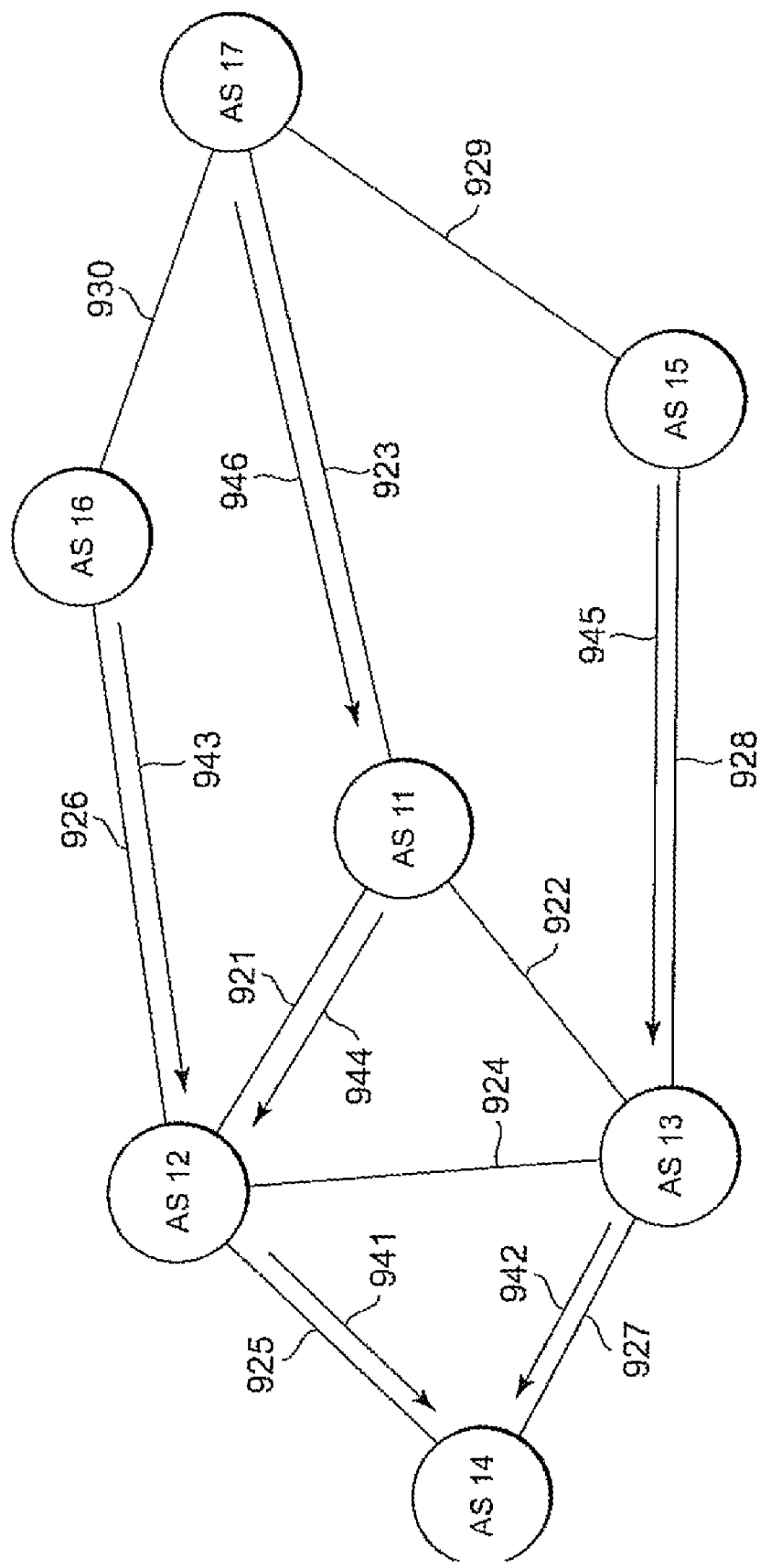
FIG. 9 is an explanatory diagram showing an example of an AS path tree.

FIG. 9 is an explanatory diagram showing an example of an AS path tree. In the example shown in FIG. 9, AS 14 is the local AS. Also, AS 14 is connected with other ASes via two links 925 and 927. In this example, when traffic reaches AS 14 via link 925, originating ASes can be four ASes: ASes 11, 12, 16, and 17. On the other hand, when traffic reaches AS 14 via link 927, originating ASes can be two ASes: ASes 13 and 15. In the example shown in FIG. 9, the AS path tree estimation section 18 groups ASes into two AS groups corresponding to the two links regarding to AS 14.

The TE target branch point determination section 19 has a function to determine an AS (hereinafter also referred to as a branch point AS) suitable for realizing a TE policy managed by the policy management section 20. The TE target branch point determination section 19 determines the branch point AS using the AS path tree estimated by the AS path tree estimation section 18 and the integrated traffic volumes received through the ASes and stored in the integrated traffic volume tables 141 to 14n. Also, the TE target branch point determination section 19 has a function to output the branch point AS and the AS paths leading to the branch point AS to the TE message processing section 31.

The policy management section 20 has a function to store the TE policy set up by the administrator. For example, the policy management section 20 establishes the TE policy set up by the administrator and stores the TE policy in a memory or other storage device. The administrator can set up the TE policy, for example, by editing, creating, or entering the TE policy. The policy management section 20 also has a function to output the established TE policy to the TE target branch point determination section 19 if necessary.

The network interface sections 21 to 2n are used to connect to external networks. In the example of FIG. 7, for example, the relay apparatus 7111 is connected to external networks via the network interface sections 21 to 2n. In FIG. 7, the relay apparatus 7111 is an example of the relay apparatus (traffic engineering apparatus) according to the present embodiment. In the example of FIG. 7, the relay apparatus 7111 is connected to a relay apparatus 722 of AS 2, relay apparatus 732 of AS 3, relay apparatus 742 of AS 4, and relay apparatus 752 of AS 5 via links 721, 731, 741, and 751, respectively.

The relay apparatuses 722, 732, 742, and 752 may have a traffic control function according to the present invention. Alternatively, the relay apparatuses 722, 732, 742, and 752 may be typical relay apparatus which does not have the traffic control function according to the present invention.

The TE message processing section 31 regulates a traffic flow rate into the local AS during reception of traffic based on the branch point determined by the TE target branch point determination section 19. Specifically, the TE message processing section 31 has a function to transmit an Explicit AS UPDATE message intended to change the path leading to the local AS from the branch point AS determined by the TE target branch point determination section 19. Also, the TE message processing section 31 has a function to receive an Explicit AS UPDATE message created and transmitted by another AS and determine content of the received Explicit AS UPDATE message. Furthermore, the TE message processing section 31 has a function to transfer the received Explicit AS UPDATE message to other ASes.

The Explicit AS UPDATE message is created by adding an Explicit AS PATH attribute to a typical BGP UPDATE message. FIG. 10 is an explanatory diagram showing an example of the Explicit AS PATH attribute. As shown in FIG. 10, according to the present embodiment, the Explicit AS PATH attribute is announced to the other ASes as information being contained in a BGP UPDATE message.

Figure 12:
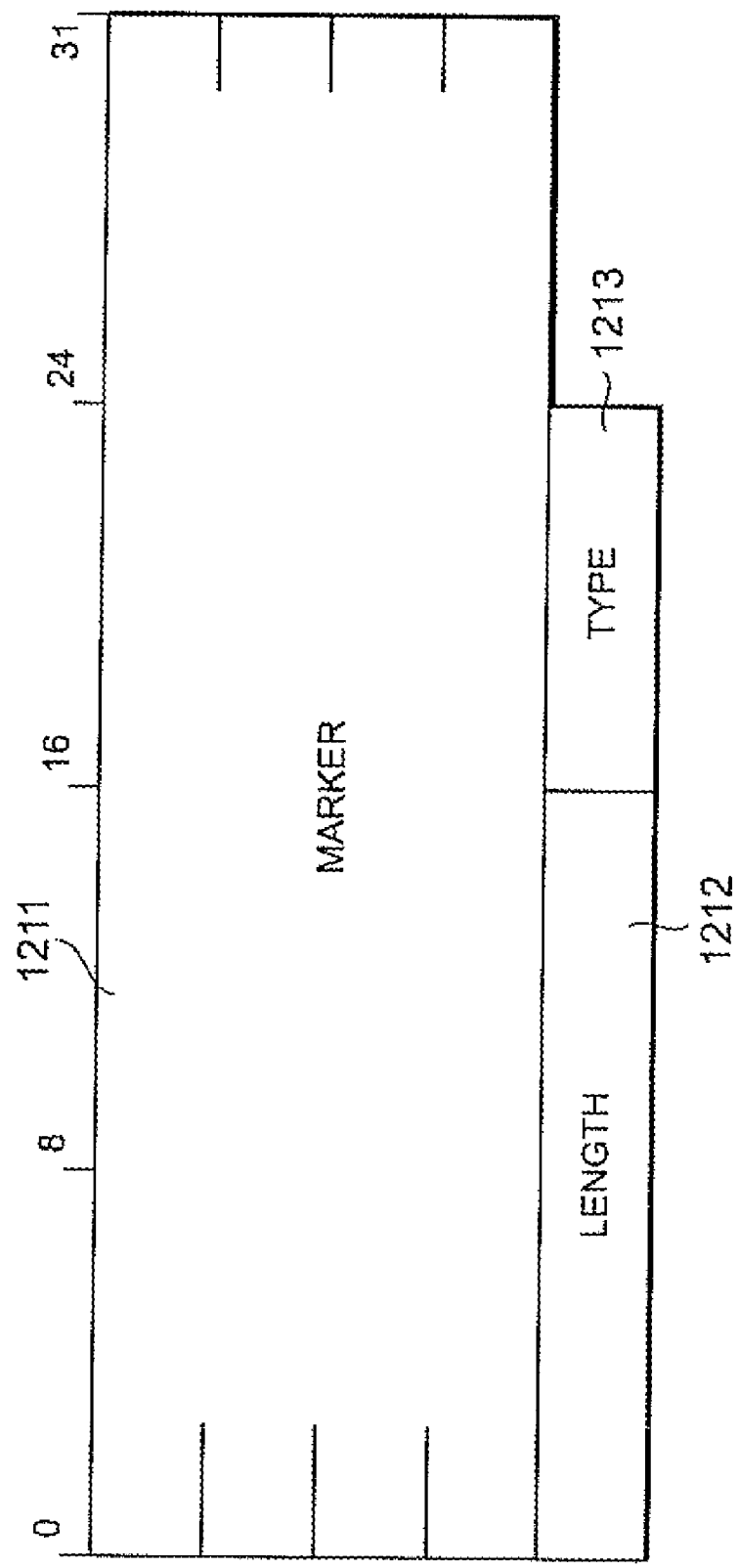
FIG. 12 is an explanatory diagram showing an example of a BGP message header.

FIG. 12 is an explanatory diagram showing an example of a BGP message header. In FIG. 12, a Marker field 1211 in the BGP message is used to detect or authenticate synchronization. A Length field 1212 represents total length of the BGP message including the header. A Type field 1213 represents the type of BGP message. A value of 2 in the Type field 1213 indicates that the field following the BGP header contains a BGP UPDATE message.

Figure 13:
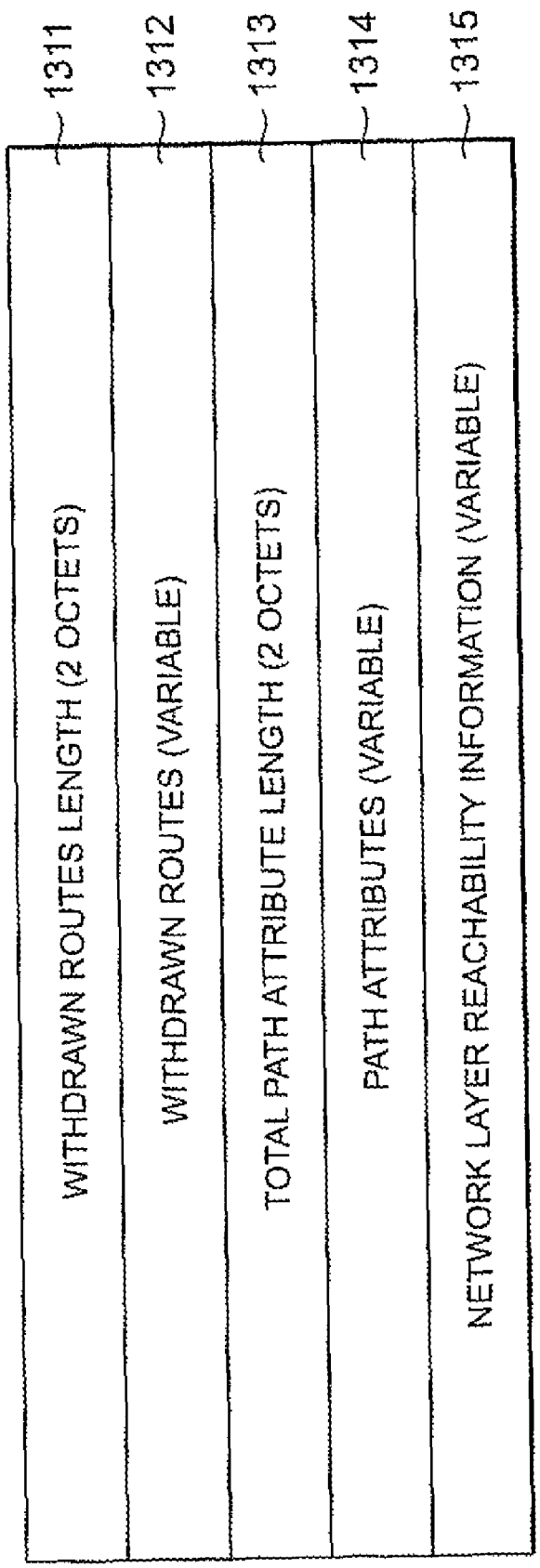
FIG. 13 is an explanatory diagram showing an example of a BGP UPDATE message.

FIG. 13 is an explanatory diagram showing an example of the BGP UPDATE message. The Withdrawn Routes Length field 1311 represents length of a Withdrawn Routes field 1312. In FIG. 13, a Withdrawn Routes Length field 1311 has a length of 2 octets. The Withdrawn Routes field 1312 is used to give notice of routes which have become unreachable. The Withdrawn Routes field 1312 has a variable length. The Total Path Attribute Length field 1313 represents length of a Path Attributes field 1314. A Total Path Attribute Length field 1313 has a length of 2 octets in FIG. 13. The Path Attributes field 1314 is used to give notice of various PATH attributes. A Network Layer Reachability Information field 1315 represents an announced prefix and length of the prefix.

According to the present embodiment, an AS pair certificate is announced as a PATH attribute. According to the present embodiment, the AS pair certificate is stored in the Path Attributes field 1314 shown in FIG. 13. The AS pair certificate is transmitted using a BGP UPDATE message. Specifically, the AS pair certificate is stored in format shown in FIG. 14.

Figure 14:
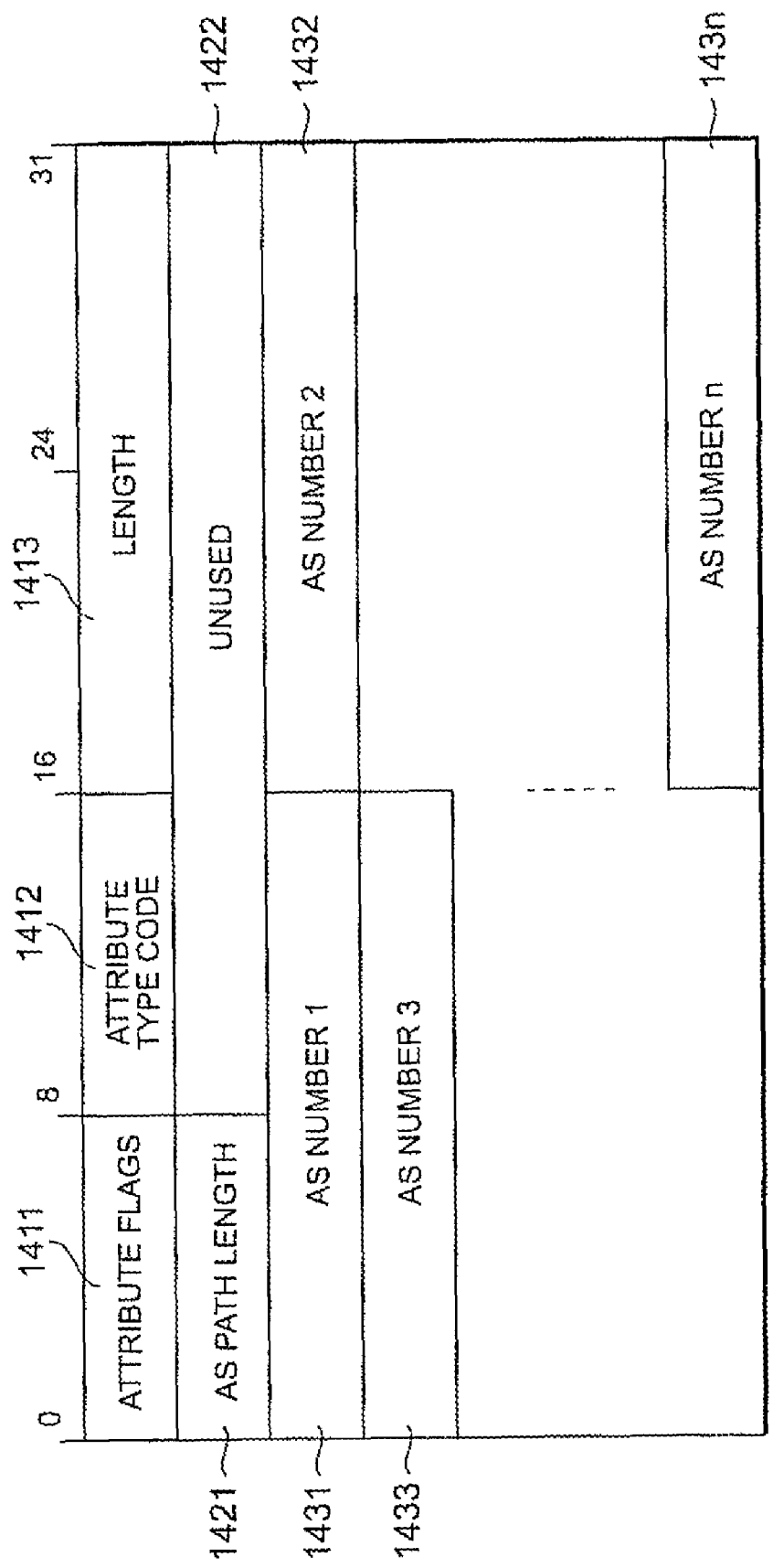
FIG. 14 is an explanatory diagram showing PATH attribute fields used to store the Explicit AS PATH attribute.

In FIG. 14, an Attribute Flags field 1411 contains various flags concerning handling of the PATH attributes. An Attribute Type Code field 1412 contains a value which represents a type of PATH attribute. According to the present invention, the Explicit AS PATH attribute is defined as a new PATH attribute. Thus, a value conventionally not assigned is stored in the Attribute Type Code field 1412. A Length field 1413 contains length of this PATH attribute.

An AS Path Length field 1421 contains the number of ASes included in the Explicit AS PATH announced using the Explicit AS PATH attribute. In the example of FIG. 14, the AS Path Length field 1421 includes n ASes indicated in AS Number fields 1431 to 143*n*. Thus, the AS Path Length field 1421 contains a value of "n." On the other hand, the AS Number fields 1431 to 143*n* contain respective AS numbers.

According to the present embodiment, the prefix 1021 of the BGP UPDATE message shown, for example, in FIG. 10 is stored in the Network Layer Reachability Information field 1315 in FIG. 13. On the other hand, an AS PATH attribute 1022 and Explicit AS PATH attribute 1023 are stored in the Path Attributes field 1314 in FIG. 13.

According to the present embodiment, when the traffic engineering apparatus is implemented by an information processor, a storage device of the information processor (not shown) which implements the traffic engineering apparatus stores various programs used for traffic flow control. For example, a storage device of the information processor which implements the traffic engineering apparatus stores a traffic control program used to make a computer perform an optimal branch point determination process and traffic flow regulation process. The optimal branch point determination process determines an optimal branch point in a network to realize a predetermined policy set up in advance to perform traffic engineering. The traffic flow regulation process regulates a traffic flow rate into the local node during reception of traffic based on the determined optimal branch point.

Figure 5:
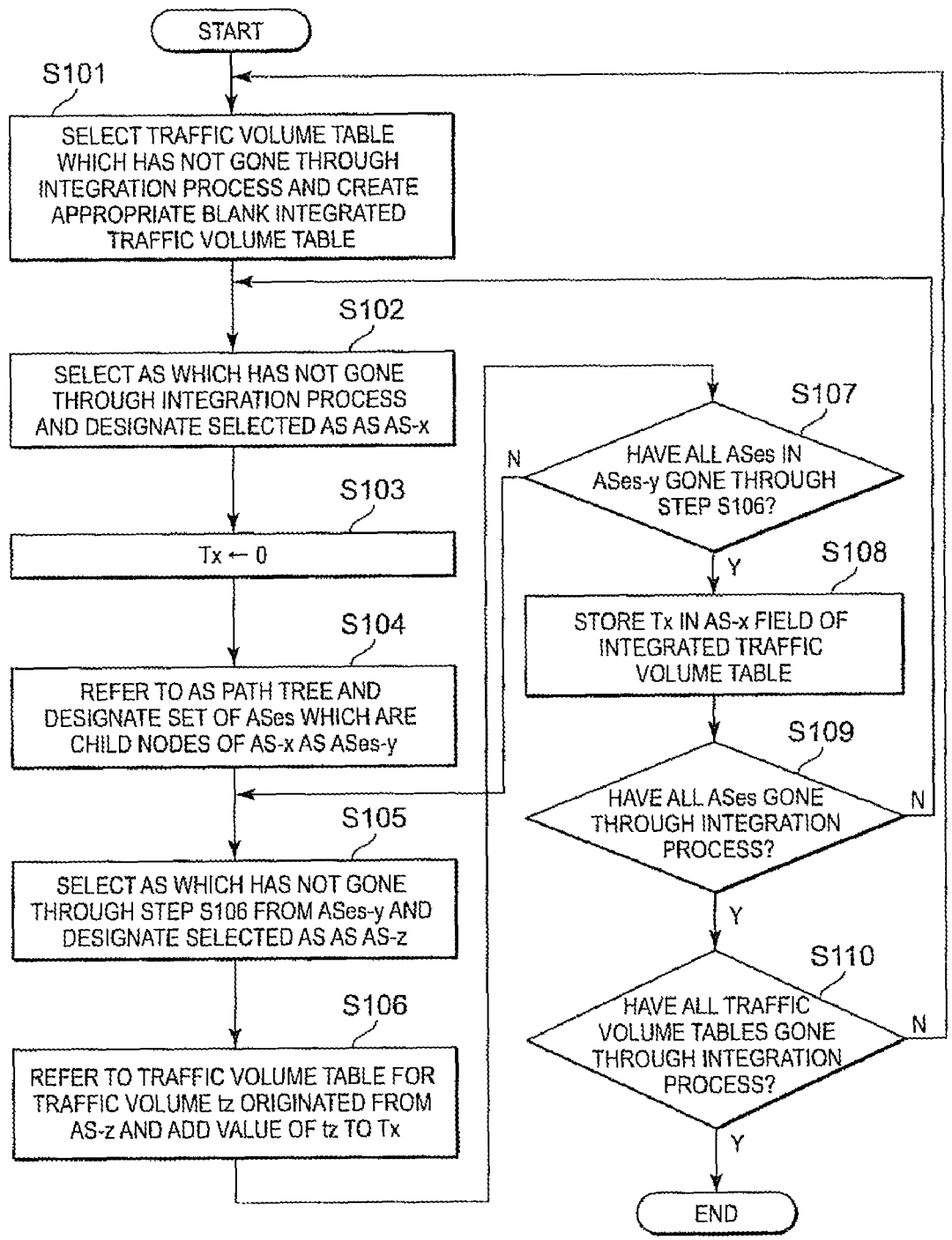
FIG. 5 is a flowchart showing an example of a process performed by the relay apparatus to create integrated traffic volume tables.

Next, operation of the relay apparatus 1 will be described. First, description will be given of an operation in which the relay apparatus 1 creates the integrated traffic volume tables 141 to 14*n*. FIG. 5 is a flowchart showing an example of a creation process performed by the relay apparatus 1 to create the integrated traffic volume tables 141 to 14*n*. Procedures for creating the integrated traffic volume tables 141 to 14*n* will be described below with reference to FIG. 5.

According to the present embodiment, the traffic information measurement section 11 of the relay apparatus 1 measures traffic information and traffic volumes, as required, based on packets received from adjacent ASes. The traffic information measurement section 11 stores the traffic information and traffic volumes in the traffic volume tables 121 to 12*n*. When a predetermined integration timing comes, the traffic volume integration section 13 starts integrating the traffic volumes using data stored in the traffic volume tables 121 to 12*n*. For example, the traffic volume integration section 13 integrates traffic volumes at predetermined intervals. Alternatively, for example, the traffic volume integration section 13 may start integrating the traffic volumes at the direction of the user.

First, the traffic volume integration section 13 selects a traffic volume table which has not gone through the integration process from among the traffic volume tables 121 to 12*n* shown in FIG. 1. Also, the traffic volume integration section 13 creates a blank integrated traffic volume table (whose fields contain null values) (Step S101). Next, the traffic volume integration section 13 selects an AS which has not gone through the integration process from the traffic volume table selected in Step S101 and designates the selected AS as AS-x (Step S102). Next, the traffic volume integration section 13 prepares a variable Tx and sets the variable Tx to a value of 0 (Step S103).

Next, the traffic volume integration section 13 refers to an AS path tree estimated by the AS path tree estimation section 18. Then, the traffic volume integration section 13 extracts ASes which are child nodes of AS-x and designates a set of the extracted ASes as ASes-y (Step S104). Next, the traffic volume integration section 13 selects an AS which has not gone through Step S106 described later from ASes-y and designates the selected AS as AS-z (Step S105). Then, the traffic volume integration section 13 refers to a traffic volume tz which is contained in the traffic volume table selected in Step S101, having been originated from AS-z selected in Step S105, and adds the value of tz to Tx (Step S106).

Next, the traffic volume integration section 13 checks whether all ASes in ASes-y have gone through the addition process in Step S106 (Step S107). If there is any AS which is yet to go through the addition process in Step S106 (N in Step S107), the traffic volume integration section 13 returns to Step S105. When all the ASes have gone through the addition process in Step S106 (Y in Step S107) the traffic volume integration section 13 goes to Step S108.

The traffic volume integration section 13 stores the value of the variable Tx in an AS-x field of the integrated traffic volume table created in Step S101 (Step S108). Next, the traffic volume integration section 13 checks whether all ASes in the traffic volume table selected in Step S101 have gone through the integration process (Step S109). If there is any AS which is yet to go through the integration process (N in Step S109), the traffic volume integration section 13 returns to Step S102. When all the ASes have gone through the integration process (Y in Step S109), the traffic volume integration section 13 goes to Step S110.

Next, the traffic volume integration section 13 checks whether all the traffic volume tables 121 to 12n shown in FIG. 1 have gone through the integration process (Step S110). If there is any traffic volume table yet to go through the integration process (N in Step S110), the traffic volume integration section 13 returns to Step S101. When all the traffic volume tables have gone through the integration process (Y in Step S110), the traffic volume integration section 13 finishes processing.

In the example of FIG. 5, the destination address 221 which is contained in the traffic volume table in FIG. 2 and is in the local AS is not divided into plural address blocks. However, the present invention is also applicable when the address in the local AS is divided into plural address blocks. The traffic volume integration section 13 can deal with such a case that the address in the local AS is divided into plural address blocks by performing the integration process in Steps S103 to S108 as many times as there are address blocks.

Figure 6:
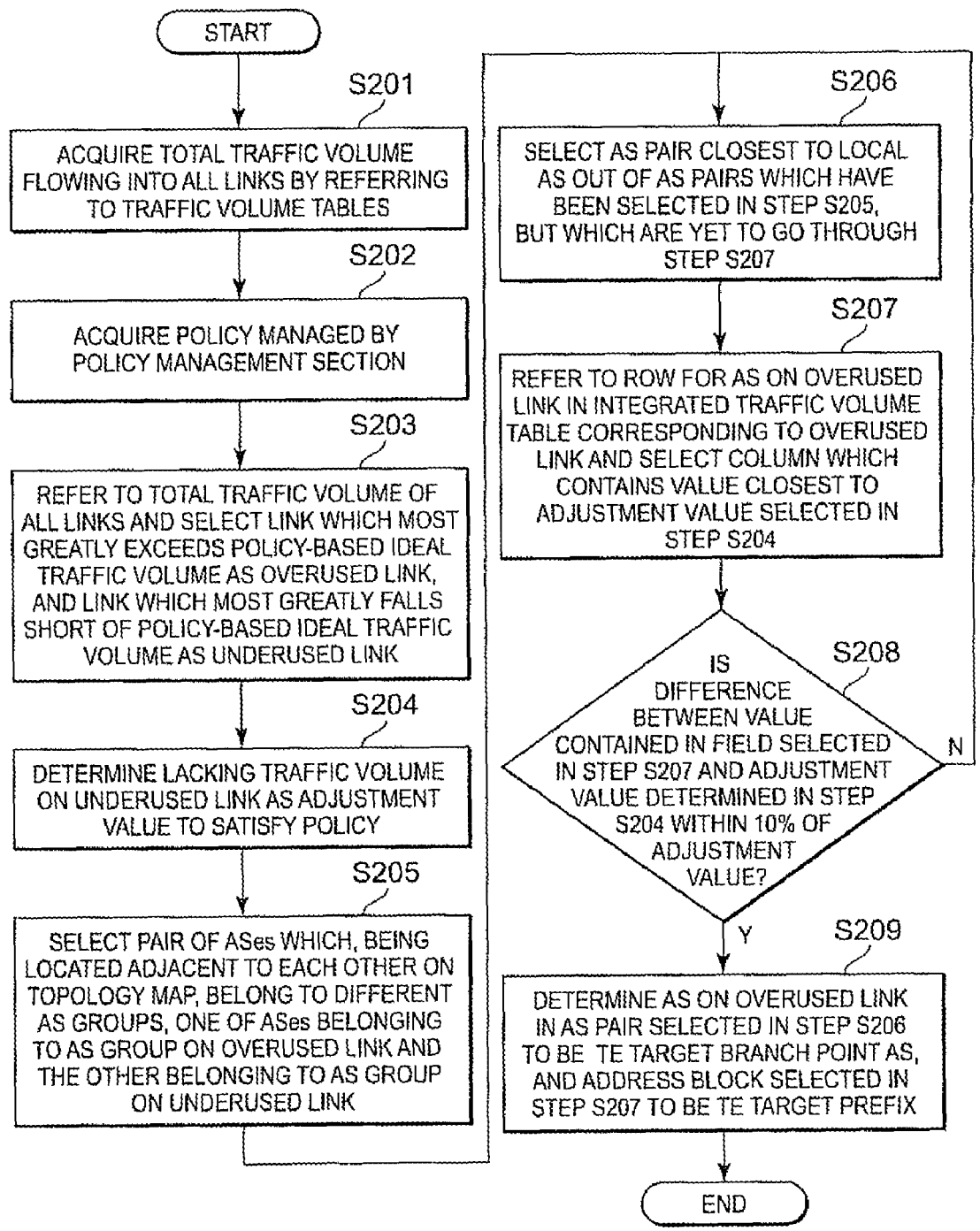

Next, the process of determining a TE target AS to be subjected to traffic engineering will be described. FIG. 6 is a flowchart showing an example of a process of determining a TE target AS. Next, procedures for determining a TE target AS will be described below with reference to FIG. 6.

According to the present embodiment, the TE target branch point determination section 19 starts a target AS determination process when a predetermined TE target AS determination timing comes. For example, the TE target branch point determination section 19 starts a TE target AS determination process at predetermined intervals. Alternatively, for example, the TE target branch point determination section 19 may start the TE target AS determination process at the direction of the user.

First, the TE target branch point determination section 19 acquires or extracts a total value of traffic volumes flowing into all links by referring to the traffic volume tables 121 to 12n (Step S201). Next, the TE target branch point determination section 19 acquires or receives a policy managed by the policy management section 20 shown in FIG. 1 (Step S202).

Next, the TE target branch point determination section 19 refers to the total value of the traffic volumes of all the links, the total value having been acquired in Step S201. Then, the TE target branch point determination section 19 selects the link which most exceeds an ideal traffic volume according to the policy as an overused link. Also, the TE target branch point determination section 19 selects the link which most falls short of the ideal traffic volume according to the policy as an underused link (Step S203).

Suppose, for example, the traffic volumes of four links A, B, C, and D are 120, 150, 80, and 50, respectively. Suppose also a policy has been established, stating that the ideal traffic volume of each link is 25% the total value. In this case, the total value of the traffic volumes of all of the links is 400 and thus the desired traffic volume of each link is 100. Of the links—links A and B—whose actual traffic volume exceeds the desired traffic volume, the TE target branch point determination section 19 selects link B whose excess traffic volume is larger as the overused link. Similarly, the TE target branch point determination section 19 selects link D whose shortfall is the largest as the underused link.

Next, to satisfy a policy condition, the TE target branch point determination section 19 determines a lacking traffic volume on the underused link as an adjustment value (Step S204). In the above example, the traffic volume of the underused link (i.e., link D) is 50. So the value of 50 is short compared to the desired value of 100. Thus, the TE target branch point determination section 19 sets the adjustment value to 50.

Next, the TE target branch point determination section 19 refers to AS groups formed by the AS path tree estimation section 18 shown in FIG. 1. Then, the TE target branch point determination section 19 selects a pair of ASes which, being located adjacent to each other on the topology map, belong to different AS groups, one of the ASes belonging to an AS group on the overused link and the other belonging to an AS group on the underused link (Step S205).

For example, in FIG. 9, it is assumed that link 925 is an overused link while link 927 is an underused link. In this example, AS 12 and AS 13 belong to different AS groups, but are located adjacent to each other. Thus, the TE target branch point determination section 19 selects a pair of AS 12 and AS 13. Similarly, the TE target branch point determination section 19 selects a pair of AS 11 and AS 13 as well as a pair of AS 15 and AS 17. That is, in the example of FIG. 9, the TE target branch point determination section 19 can select three AS pairs.

Next, the TE target branch point determination section 19 selects the AS pair closest to the local AS out of the AS pairs which have been selected in Step S205, but which are yet to go through a process in Step S207 (Step S206). In selecting the AS pair closest to the local AS, the TE target branch point determination section 19 selects AS pairs in which the AS on the underused link is the closest to the local AS. Then, out of the selected AS pairs, the TE target branch point determination section 19 selects the AS pair in which the AS on the overused link is the closest to the local AS.

For example, in FIG. 9, the TE target branch point determination section 19 compares the AS pairs selected in Step S205, i.e., the AS pairs in which the AS on the underused link is the closest to the local AS: namely, the pair of AS 13 and AS 12 and the pair of AS 13 and AS 11. When the ASes on the overused link are compared, AS 12 is closer than AS 11 to the local AS 14. Thus, the TE target branch point determination section 19 selects the pair of AS 13 and AS 12. Incidentally, if there are plural AS pairs which are at the same distance from the local AS both on the overused link and on the underused link, the TE target branch point determination section 19 may select any of the AS pairs.

Next, in relation to the AS pairs selected in Step S205, the TE target branch point determination section 19 refers to the row for the AS on the overused link in the integrated traffic volume table corresponding to the overused link. Then, the TE target branch point determination section 19 selects the column which contains a value closest to the adjustment value selected in Step S204 (Step S207).

Next, the TE target branch point determination section 19 finds the difference between the value contained in the field selected in Step S207 and the adjustment value determined in Step S204. Then, the TE target branch point determination section 19 checks whether the difference is within 10% of the adjustment value (Step S208). If the result of Step S208 is larger than 10%, the TE target branch point determination section 19 determines that the difference is too large. Then, the TE target branch point determination section 19 returns to Step S206 to select another AS pair. If the result of Step 5208 is smaller than 10%, the TE target branch point determination section 19 goes to Step S209.

In Step S209, the TE target branch point determination section 19 determines the AS on the overused link in the AS pair selected in Step S206, to be a TE target branch point AS. Then, the TE target branch point determination section 19 determines the address block selected in Step S207, to be a TE target prefix (Step S209). Then, the TE target branch point determination section 19 finishes processing.

The relay apparatus 1 can lead the TE target prefix for the TE target branch point AS determined through the above process to the underused link and thereby bring the traffic volume more closely in line with the policy.

Figure 11:
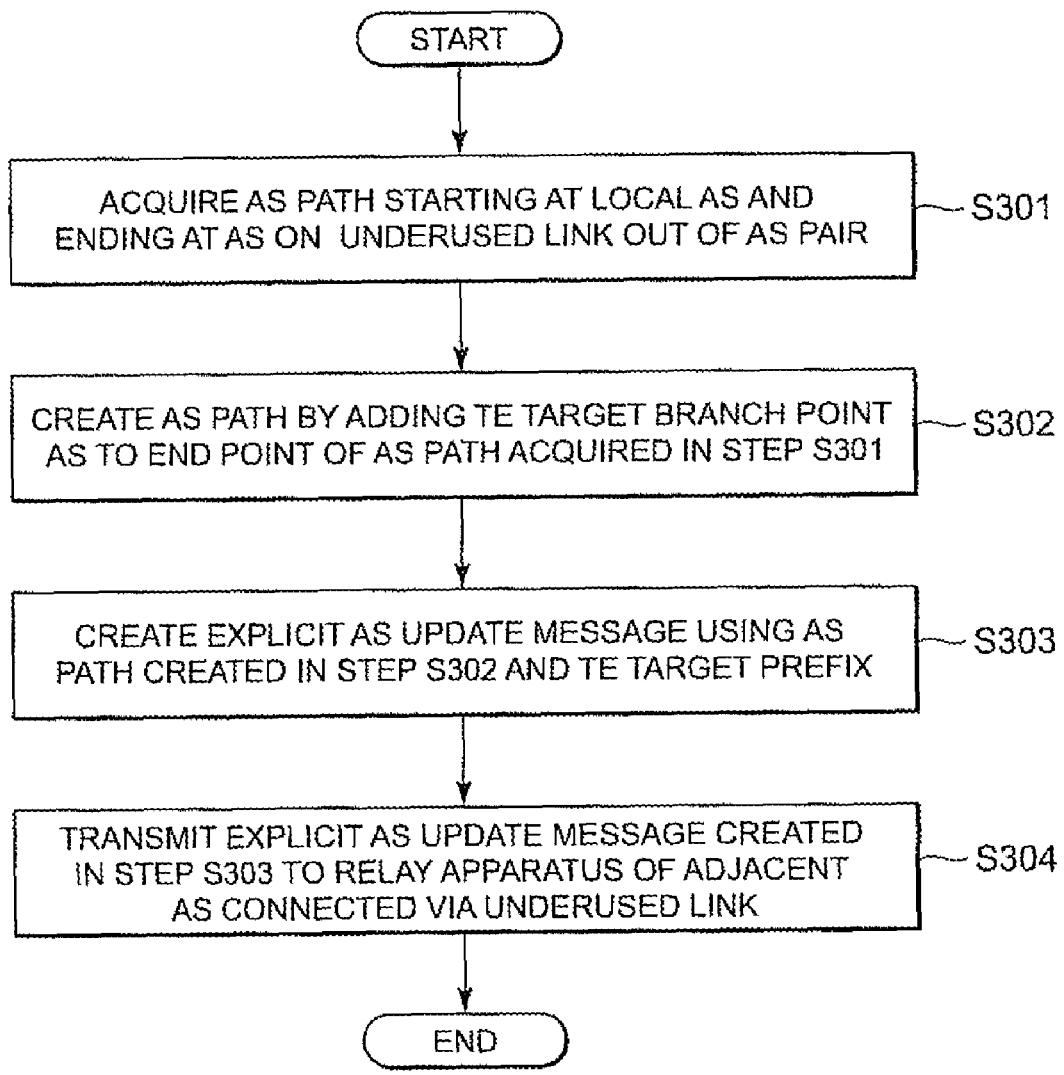
FIG. 11 is a flowchart showing an example of a process performed by a TE message processing section to transmit an Explicit AS UPDATE message.

Next, description will be given of Explicit AS UPDATE message transmission procedures carried out by the TE message processing section 31 shown in FIG. 1. FIG. 11 is a flowchart showing an example of a process performed by the TE message processing section 31 to transmit an Explicit AS UPDATE message.

First, the TE message processing section 31 refers to an AS path tree estimated by the AS path tree estimation section 18. Then, the TE message processing section 31 acquires or identifies an AS path starting at the local AS and ending at the other than the TE target branch point AS (AS on the underused link) out of the AS pair handled in the TE target AS determination process (Step S301).

Next, the TE message processing section 31 creates an AS path by adding the TE target branch point AS to the end point of the AS path acquired in Step S301 (Step S302). As an example, it is assumed that in FIG. 9, AS 17 is the TE target branch point AS in a pair of AS 15 and AS 17. In Step S301, the TE message processing section 31 acquires a path leading from the local AS (AS 14) to AS 15: AS 14→AS 13→AS 15. Next, in Step S302, the TE message processing section 31 adds AS 17 to the acquired path to obtain a path: AS 14→AS 13→AS 15→AS 17.

Next, the TE message processing section 31 creates an Explicit AS UPDATE message using the AS path obtained or created in Step S302 and the TE target prefix (Step S303). Then, the TE message processing section 31 transmits the Explicit AS UPDATE message created in Step S303 to the relay apparatus of the adjacent AS connected via the underused link (Step S304).

Figure 15:
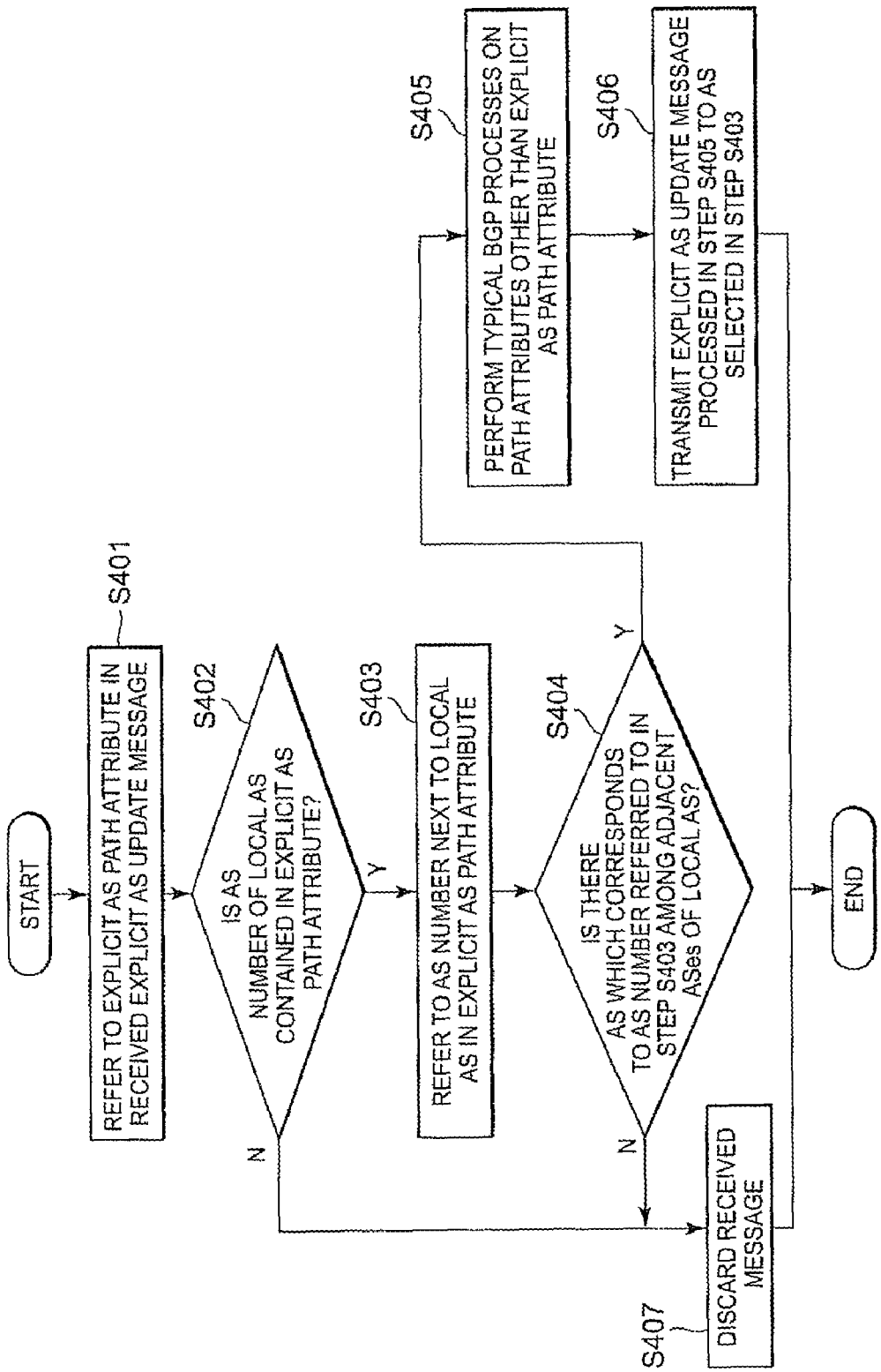
FIG. 15 is a flowchart showing an example of an Explicit AS UPDATE message transfer process.

Next, description will be given of a transfer operation performed by the relay apparatus 1 shown in FIG. 1 upon receiving an Explicit AS UPDATE message created by the relay apparatus in another AS. FIG. 15 is a flowchart showing an example of an Explicit AS UPDATE message transfer process.

First, upon receiving an Explicit AS UPDATE message from the relay apparatus in another AS, the TE message processing section 31 refers to the Explicit AS PATH attribute in the Explicit AS UPDATE message (Step S401). Next, the TE message processing section 31 checks whether the AS number of the local AS is contained in the Explicit AS PATH attribute (Step S402). If the AS number of the local AS is not contained (N in Step S402), the TE message processing section 31 goes to Step S407. If the AS number of the local AS is contained (Y in Step S402), the TE message processing section 31 goes to Step S403.

In Step S403, the TE message processing section 31 refers to the AS number next to the AS number of the local AS in the Explicit AS PATH attribute (Step S403). Then, the TE message processing section 31 checks whether an AS which corresponds to the AS number referred to in Step S403 really exists among adjacent ASes of the local AS (Step S404). If there is no AS which corresponds to the AS number referred to in Step S403 (N in Step S404), the TE message processing section 31 goes to Step S407. If there is an AS which corresponds to the AS number referred to in Step S403 (Y in Step S404), the TE message processing section 31 goes to Step S405.

In Step S405, the TE message processing section 31 performs typical BGP processes on Path attributes other than the Explicit AS PATH attribute (Step S405). Next, the TE message processing section 31 transmits the Explicit AS UPDATE message processed in Step S405 to the AS selected in Step S403 (Step S406).

In Step S407, the TE message processing section 31 discards the received Explicit AS UPDATE message without transferring the message to the adjacent AS (Step S407).

As described above, according to the present embodiment, the TE target branch point determination section 19 determines the optimal TE target branch point in the network to realize a policy set up in advance in order to perform traffic engineering. Then, the TE message processing section 31 regulates the traffic flow rate into the local node during reception of traffic based on the TE target branch point determined by the TE target branch point determination section 19. Since the traffic flow rate can be regulated, the present embodiment can prevent the number of messages from increasing and thereby prevent message processing load from increasing when performing traffic engineering.

Figure 20:
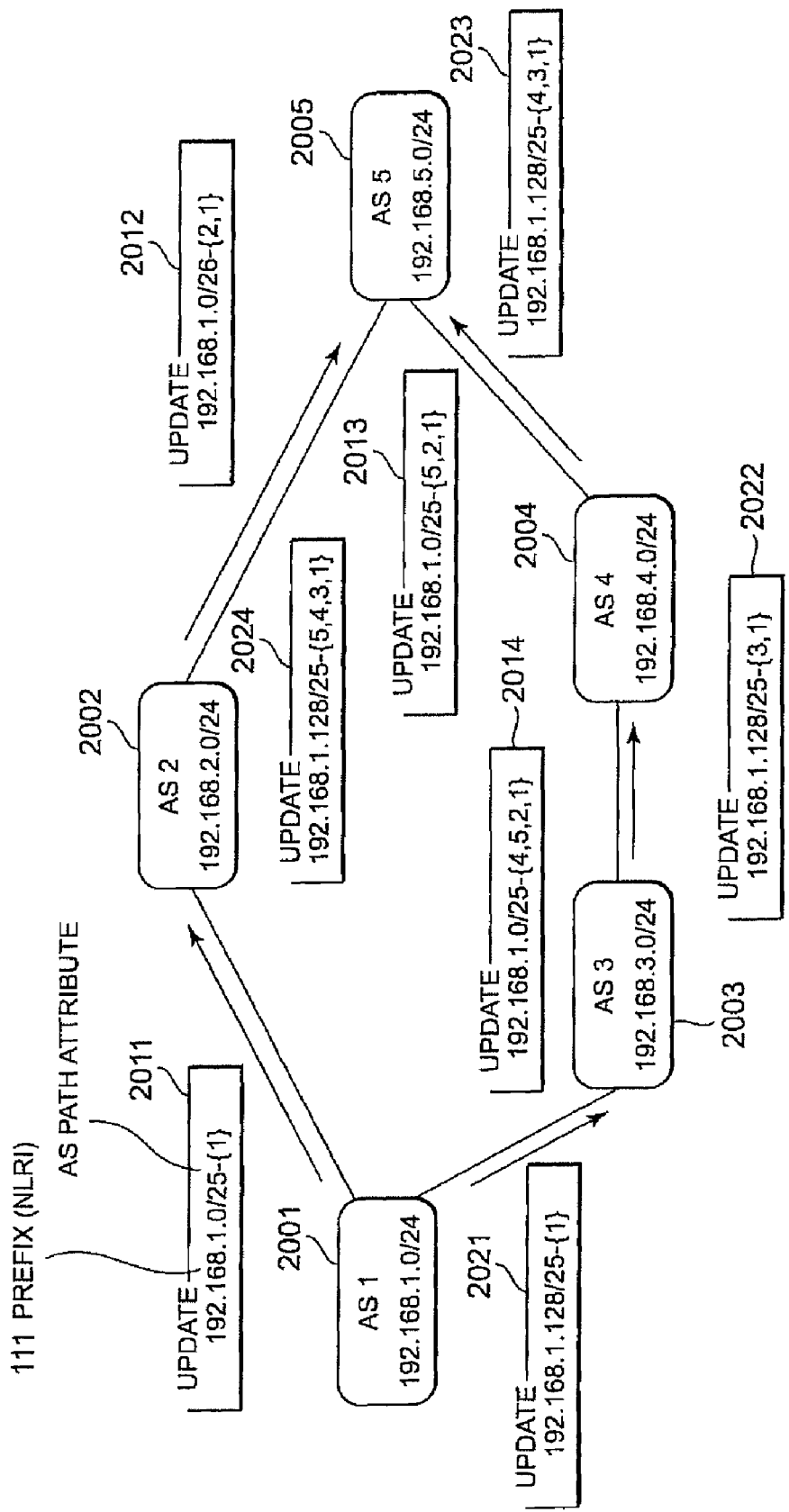
FIG. 20 is an explanatory diagram showing traffic engineering based on BGP.

Also, typically, conventional traffic engineering (TE) using BGP has a problem in that a prefix has to be divided manually to implement TE suitable for the local policy, adding a burden on the user. For example, in FIG. 20, even though TE is performed by dividing the address prefix in the local AS into two address blocks, this does not necessarily mean that the actual traffic is divided into 50% portions. This is because traffic is not always uniform among different destination addresses. This makes it necessary to manually adjust how an address prefix should be divided while watching actual situations of traffic in order to realize a desired policy.

On the other hand, according to the present embodiment, the TE message processing section 31 automatically adjusts the traffic flow rate based on the TE target branch point. This makes it possible to implement traffic engineering in line with a desired policy without manual intervention, reducing the burden on the administrator.

Second Embodiment

A second embodiment of the present invention will be described with reference to the drawings. According to the first embodiment, the traffic engineering apparatus is implemented by a relay apparatus. On the other hand, according to the second embodiment, a traffic engineering apparatus is implemented by a computing apparatus provided separately from a relay apparatus.

Figure 16:
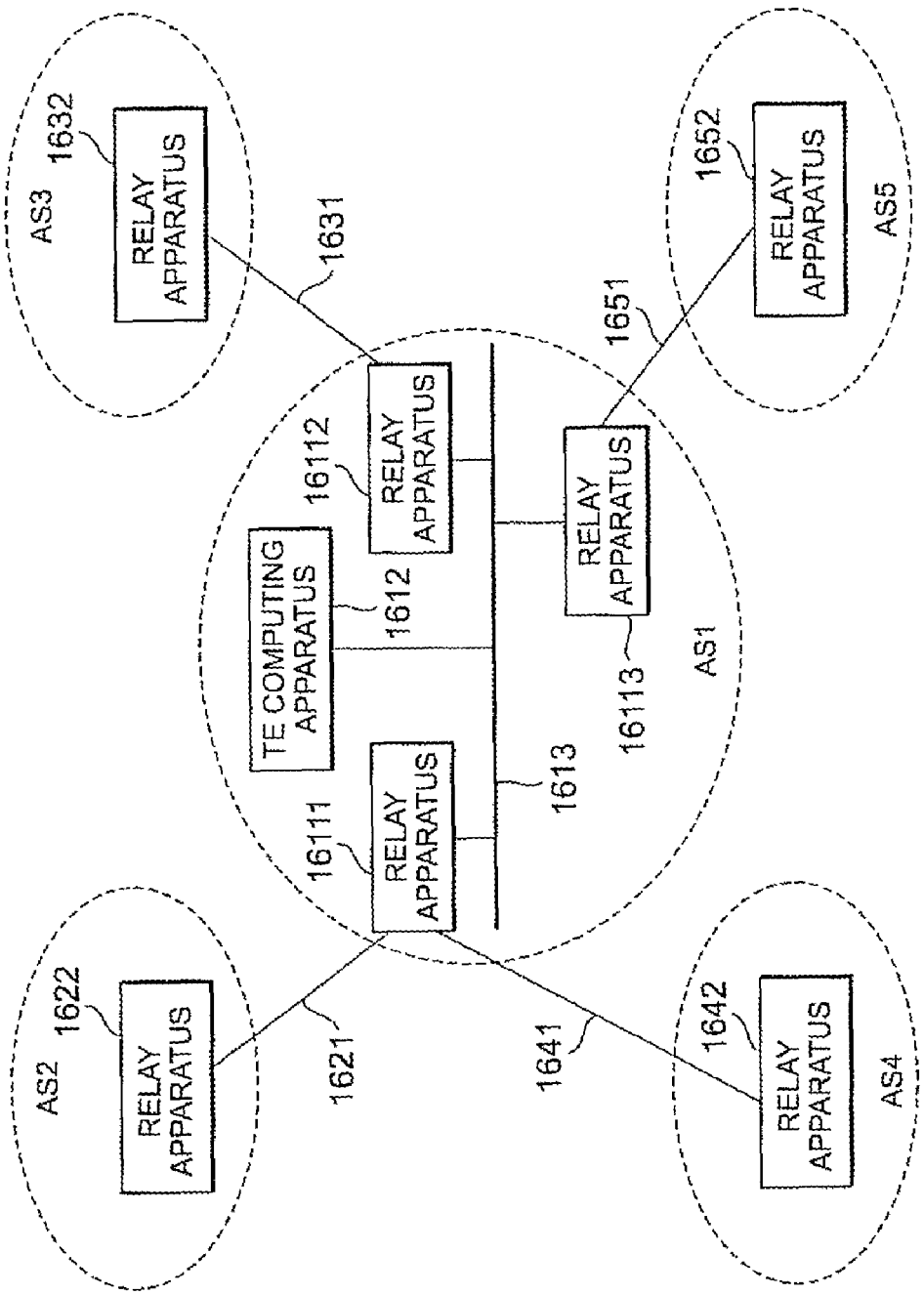
FIG. 16 is a block diagram showing an exemplary configuration of a network system in which a computing apparatus according to a second embodiment is included in an actual network.

FIG. 16 is a block diagram showing an exemplary configuration of a network system in which the computing apparatus according to the second embodiment is installed on an actual network. As shown in FIG. 16, according to the present embodiment, AS 1 includes plural relay apparatuses 16111, 16112, and 16113. Also, the relay apparatuses 16111, 16112, and 16113 are connected to other ASes via links 1621, 1631, 1641, and 1651.

In the example of FIG. 16, the links are externally connected to different relay apparatus. Thus, traffic engineering cannot be performed among the links using the relay apparatus according to the first embodiment. According to the present embodiment, to perform traffic engineering, AS 1 has a computing apparatus (hereinafter also referred to as a TE computing apparatus) 1612 aside from the relay apparatuses 16111, 16112, and 16113. The TE computing apparatus 1612 determines a branch point AS by gathering information from the plural relay apparatuses 16111, 16112, and 16113.

Figure 17:
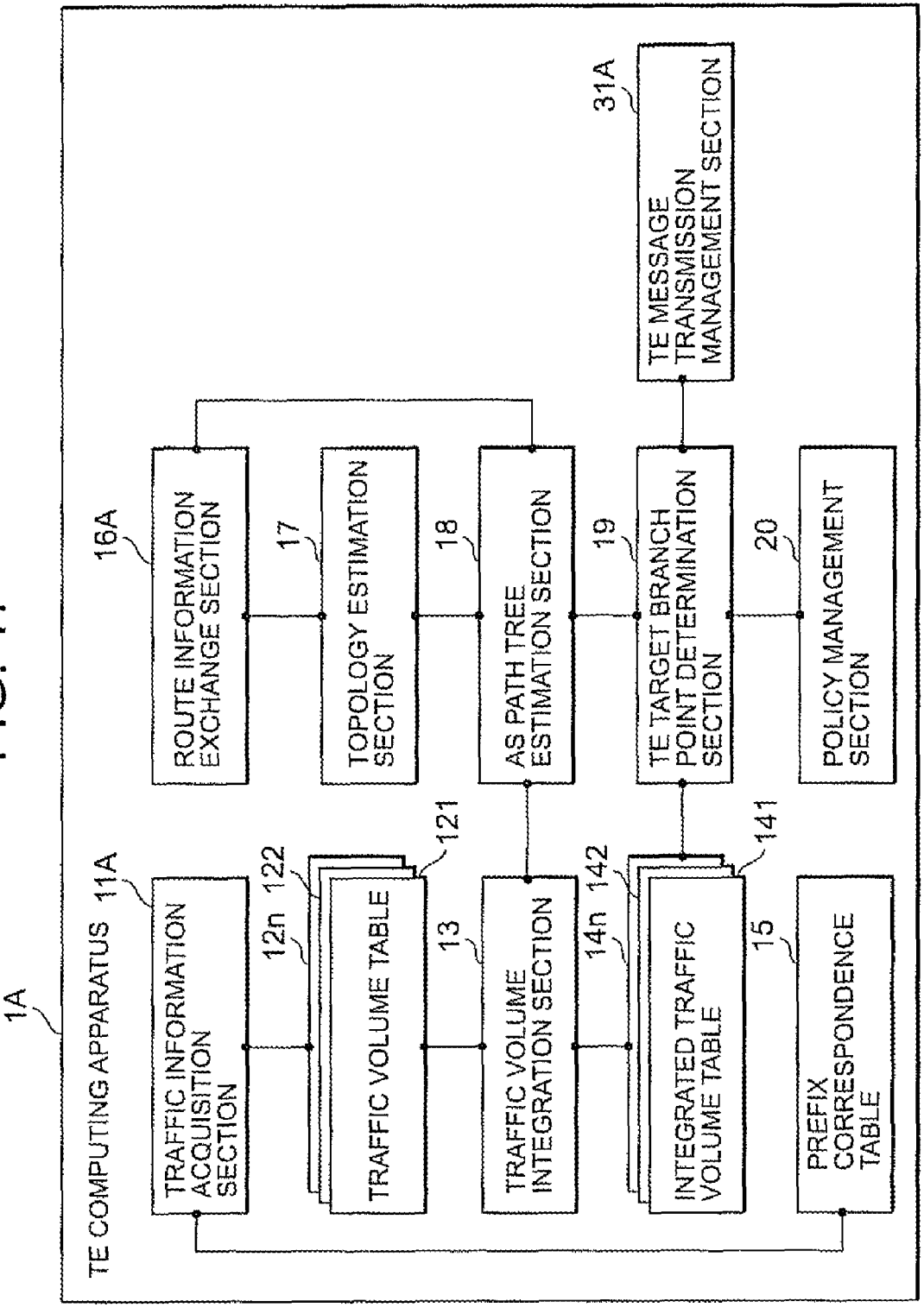
FIG. 17 is a block diagram showing an exemplary configuration of the TE computing apparatus according to the second embodiment.

FIG. 17 is a block diagram showing an exemplary configuration of the TE computing apparatus according to the second embodiment. As shown in FIG. 17, a TE computing apparatus 1A according to the present embodiment differs from the relay apparatus 1 (see FIG. 1) according to the first embodiment in that the TE computing apparatus 1A includes a traffic information acquisition section 11A instead of the traffic information measurement section 11. A TE computing apparatus 1A according to the present embodiment differs from the relay apparatus 1 (see FIG. 1) according to the first embodiment in that the TE computing apparatus 1A includes a TE message transmission management section 31A instead of the TE message processing section 31. Also, a route information exchange section 16A of the TE computing apparatus 1A has a function different from that of the route information exchange section 16 according to the first embodiment of the relay apparatus 1 shown in FIG. 1.

Functions other than those of the traffic information acquisition section 11A, route information exchange section 16A, and TE message transmission management section 31A are the same as the corresponding functions according to the first embodiment.

According to the present embodiment, a traffic engineering apparatus is implemented by the TE computing apparatus 1A. Specifically it is implemented by a network apparatus such as a BGP router. Alternatively, the TE computing apparatus 1A may be implemented, for example, by an information processor such as a personal computer which has a router function and operates according to a program.

The traffic information acquisition section 11A has a function to acquire or receive traffic information about links for external connections from the other relay apparatuses 16111, 16112, and 16113 in AS 1. To acquire the traffic information, each time a packet is received by any of the relay apparatuses 16111, 16112, and 16113, the source address, destination address, and packet size of the packet are transmitted as a set to the TE computing apparatus.

Incidentally, instead of transmitting traffic information about all the packets received by the relay apparatuses 16111, 16112, and 16113, the relay apparatuses 16111, 16112, and 16113 may sample the traffic information and thereby transmit. For example, they sample one packet of information out of every 100 packets received. When one packet of information out of every n packets received is transmitted (i.e., at a sampling rate of 1/n) in this way, all the relay apparatuses 16111, 16112, and 16113 in the local AS need to use the same sampling rate.

The TE message transmission management section 31A has a function to give an instruction to transmit an Explicit AS UPDATE message created in the same manner as in the first embodiment to that of the relay apparatuses 16111, 16112, and 16113 which is connected to an underused link.

Besides, according to the present embodiment, the route information exchange section 16A is not connected to external ASes unlike in the first embodiment. However, by using BGP in relation to the other relay apparatuses 16111, 16112, and 16113 in the local AS, the route information exchange section 16A can receive BGP messages received by the other relay apparatuses 16111, 16112, and 16113 from other ASes. Other functions of the route information exchange section 16A are the same as those of the route information exchange section 16 according to the first embodiment.

As described above, according to the present embodiment, AS 1 has a TE computing apparatus aside from the relay apparatus. The TE computing apparatus determines a TE target branch point in a network to implement traffic engineering or realize a predetermined policy set up in advance. Then, the TE computing apparatus regulates a traffic flow rate into the local node during reception of traffic based on the determined TE target branch point. Thus this configuration can implement traffic engineering, in addition to providing the advantage of the first embodiment, even when there are multiple relay apparatuses.

Figure 18:
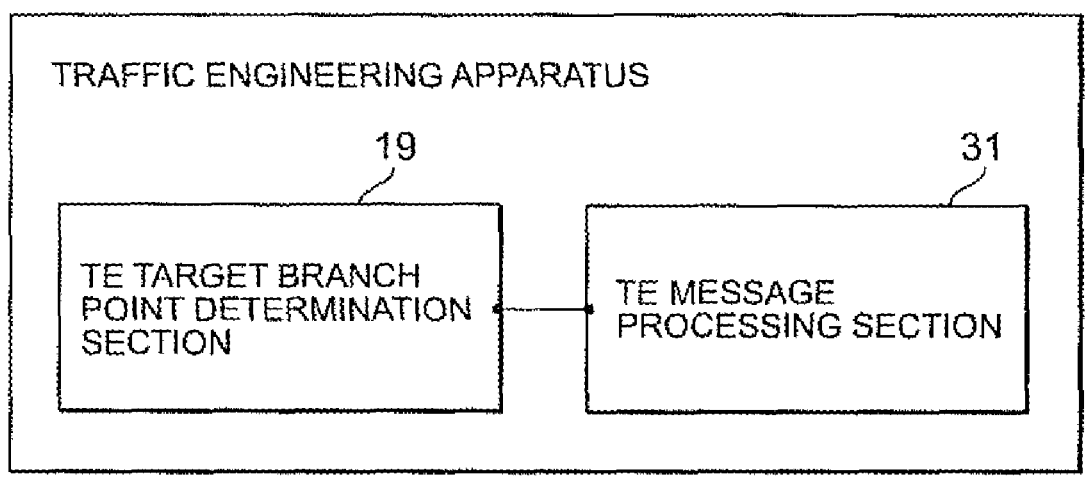
FIG. 18 is a block diagram showing an exemplary minimum configuration of the traffic engineering apparatus.
Figure 19:
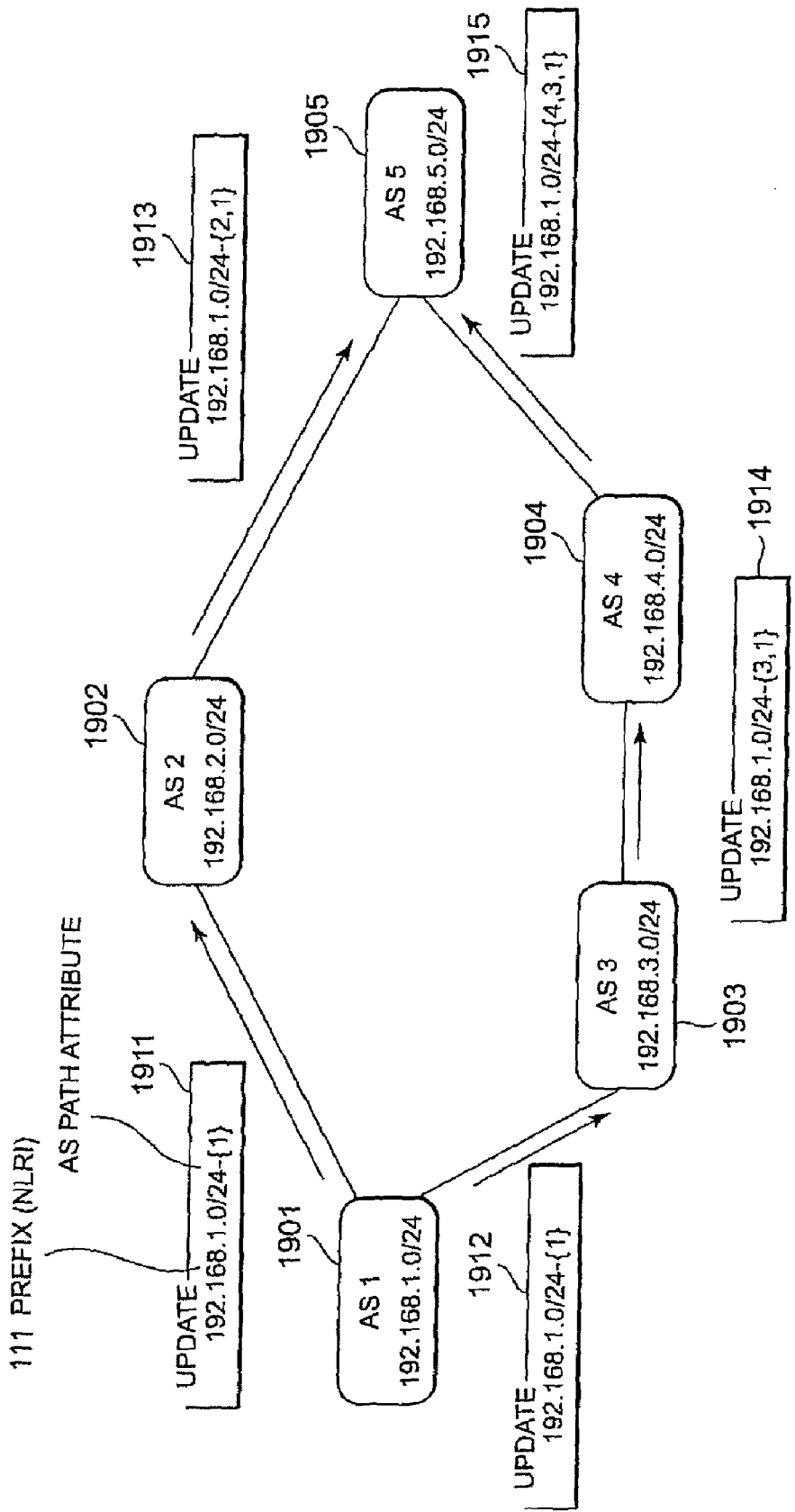
FIG. 19 is an explanatory diagram showing how an address prefix is propagated by using BGP.

Next, a minimum configuration of the traffic engineering apparatus according to the present invention will be described. FIG. 18 is a block diagram showing an exemplary minimum configuration of the traffic engineering apparatus. As shown in FIG. 18, the traffic engineering apparatus includes the TE target branch point determination section 19 and TE message processing section 31 as minimum components.

The TE target branch point determination section 19 has a function to determine an optimal branch point in a network to realize a predetermined policy set up in advance to perform traffic engineering. The TE message processing section 31 has a function to regulate a traffic flow rate into the local node during reception of traffic based on the optimal branch point determined by the TE target branch point determination section 19.

The traffic engineering apparatus of the minimum configuration shown in FIG. 18 can prevent the number of messages from increasing and thereby prevent message processing load form increasing in when performing traffic engineering.

The embodiments described above provide characteristic configurations of a traffic engineering apparatus shown in (1) to (11) below.

(1) A traffic engineering apparatus (e.g., the relay apparatus 1 or TE computing apparatus 1A) which performs traffic engineering, comprises: an optimal branch point determination unit (implemented, for example, by the TE target branch point determination section 19) which determines an optimal branch point (e.g., TE target branch point) in a network to realize a predetermined policy; and a traffic flow regulation unit (implemented, for example, by the TE message processing section 31 or TE message transmission management section 31A) which regulates a traffic flow rate into the local node during reception of traffic based on the optimal branch point determined by the optimal branch point determination unit.

(2) In the traffic engineering apparatus, the optimal branch point determination unit may be configured to select a branch point in the network closer to the local node as the optimal branch point.

(3) In the traffic engineering apparatus, the optimal branch point determination unit may be configured to determine the optimal branch point using topology information (e.g., a topology map) about the network.

(4) In the traffic engineering apparatus, the optimal branch point determination unit may be configured to determine the optimal branch point using autonomous-system path information (e.g., Explicit AS PATH attribute) in a route control message (e.g., an Explicit AS UPDATE message).

(5) The traffic engineering apparatus may comprise a path tree estimation unit (implemented, for example, by the AS path tree estimation section 18) which estimates an autonomous-system path tree which represents traffic flow into the node, based on the autonomous-system path information.

(6) In the traffic engineering apparatus, the optimal branch point determination unit may be configured to identify an adjacent autonomous system which is adjacent to the autonomous system of the node but traffic flows from the adjacent autonomous system into the node via links not included the adjacent autonomous system as a candidate for the optimal branch point using the autonomous-system path tree and the topology information about the network.

(7) In the traffic engineering apparatus, the optimal branch point determination unit may be configured to determine the optimal branch point using a traffic volume of each link.

(8) The traffic engineering apparatus may comprise a traffic volume table (e.g., the traffic volume tables 121 to 12n) which contains traffic volumes associated with respective senders, wherein the optimal branch point determination unit may determine the optimal branch point using the traffic volumes contained in the traffic volume table.

(9) The traffic engineering apparatus may further comprise a traffic volume integration unit (implemented, for example, by the traffic volume integration section 13) which calculates an integrated value of traffic volumes passing through each autonomous system based on the traffic volumes of the respective source autonomous system contained in the traffic volume table as well as on autonomous-system path information and records the integrated value of the traffic volumes in an integrated traffic volume table (e.g., the integrated traffic volume tables 141 to 14n).

(10) In the traffic engineering apparatus, the optimal branch point determination unit may be configured to select the optimal branch point in such a way as to bring the traffic flowing into the local node close to a policy of the traffic engineering apparatus, based on the integrated value of the traffic volumes contained in the integrated traffic volume table.

(11) In the traffic engineering apparatus, the traffic flow regulation unit may be configured to change a path leading from the branch point determined by the optimal branch point determination unit to the local node.

The present invention is mainly applicable to a router apparatus equipped with BGP functions and used by Internet service providers that provide Internet connection services.

What is claimed is:

1. A traffic engineering apparatus which performs traffic engineering, comprising:
    an optimal branch point determination unit which determines an optimal branch point in a network to realize a predetermined policy;
    a traffic flow regulation unit which regulates a traffic flow rate into a node during reception of traffic based on the optimal branch point determined by the optimal branch point determination unit;
    a traffic volume table which contains traffic volumes associated with respective senders; and
    a traffic volume integration unit which calculates an integrated value of traffic volumes passing through each autonomous system based on the traffic volumes of the respective source autonomous system contained in the traffic volume table as well as on autonomous-system path information, and records the integrated value of the traffic volumes in an integrated traffic volume table,
    wherein the optimal branch point determination unit determines the optimal branch point using the traffic volumes contained in the traffic volume table.

2. The traffic engineering apparatus according to claim 1, wherein the optimal branch point determination unit selects a branch point in the network closer to the node as the optimal branch point.

3. The traffic engineering apparatus according to claim 1, wherein the optimal branch point determination unit determines the optimal branch point using topology information about the network.

4. The traffic engineering apparatus according to claim 1, wherein the optimal branch point determination unit determines the optimal branch point using autonomous-system path information in a route control message.

5. The traffic engineering apparatus according to claim 4, further comprising a path tree estimation unit which estimates an autonomous-system path tree which represents traffic flow into the node, based on the autonomous-system path information.

6. The traffic engineering apparatus according to claim 5, wherein the optimal branch point determination unit identifies an adjacent autonomous system which is adjacent to the autonomous system of the node but the traffic flows from the adjacent autonomous system into the node via links not included the adjacent autonomous system as a candidate for the optimal branch point using the autonomous-system path tree and the topology information about the network.

7. The traffic engineering apparatus according to claim 1, wherein the optimal branch point determination unit determines the optimal branch point using a traffic volume of each link.

8. The traffic engineering apparatus according to claim 1, wherein the optimal branch point determination unit selects the optimal branch point in such a way as to bring the traffic flowing into the local node close to a policy of the traffic engineering apparatus, based on the integrated value of the traffic volumes contained in the integrated traffic volume table.

9. The traffic engineering apparatus according to claim 1, wherein the traffic flow regulation unit changes a path leading from the branch point determined by the optimal branch point determination unit to the local node.

10. A network system including a traffic engineering apparatus which performs traffic engineering, wherein: the traffic engineering apparatus comprises an optimal branch point determination unit which determines an optimal branch point in a network to realize a predetermined policy; a traffic flow regulation unit which regulates a traffic flow rate into a local node during reception of traffic based on the optimal branch point determined by the optimal branch point determination unit; a traffic volume table which contains traffic volumes associated with respective senders; and a traffic volume integration unit which calculates an integrated value of traffic volumes gassing through each autonomous system based on the traffic volumes of the respective source autonomous system contained in the traffic volume table as well as on autonomous-system path information, and records the integrated value of the traffic volumes in an integrated traffic volume table, wherein the optimal branch point determination unit determines the optimal branch point using the traffic volumes contained in the traffic volume table.

11. The network system according to claim 10, wherein the optimal branch point determination unit selects a branch point in the network closer to the local node as the optimal branch point.

12. A traffic control method for performing traffic flow control, comprising: an optimal branch point determination step of determining an optimal branch point in a network to realize a predetermined policy using traffic volumes contained in a traffic volume table, wherein the traffic volume table contains the traffic volumes associated with respective senders; a traffic flow regulation step of regulating a traffic flow rate into a local node during reception of traffic based on the optimal branch point determined by the optimal branch point determination step; and a traffic volume integration step of calculating an integrated value of traffic volumes passing through each autonomous system based on the traffic volumes of the respective source autonomous system contained in the traffic volume table as well as on autonomous-system path information, and recording the integrated value of the traffic volumes in an integrated traffic volume table.

13. The traffic control method according to claim 12, wherein the optimal branch point determination step selects a branch point in the network closer to the local node as the optimal branch point.

14. A non-transitory computer-readable medium encoded with a traffic control program for traffic flow control, wherein the traffic control program makes a computer perform: an optimal branch point determination process for determining an optimal branch point in a network to realize a predetermined policy using traffic volumes contained in a traffic volume table, wherein the traffic volume table contains the traffic volumes associated with respective senders; a traffic flow regulation process for regulating a traffic flow rate into a local node during reception of traffic based on the optimal branch point determined by the optimal branch point determination process; and a traffic volume integration process for calculating an integrated value of traffic volumes passing through each autonomous system based on the traffic volumes of the respective source autonomous system contained in the traffic volume table as well as on autonomous-system path information, and recording the integrated value of the traffic volumes in an integrated traffic volume table.

15. The non-transitory computer-readable medium of claim 14, wherein the optimal branch point determination process selects a branch point in the network closer to the local node as the optimal branch point.

\* \* \* \* \*